United States Patent
Matsune et al.

(10) Patent No.: US 12,461,897 B2
(45) Date of Patent: Nov. 4, 2025

(54) CLOUD DATA BASE SYSTEM AND DATA MANAGEMENT METHOD

(71) Applicant: Hitachi, Ltd., Tokyo (JP)

(72) Inventors: Takaki Matsune, Tokyo (JP); Yukihiro Yoshino, Tokyo (JP); Akio Tatsumi, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 18/829,804

(22) Filed: Sep. 10, 2024

(65) Prior Publication Data

US 2025/0307216 A1    Oct. 2, 2025

(51) Int. Cl.
*G06F 16/188*    (2019.01)
*G06F 16/182*    (2019.01)

(52) U.S. Cl.
CPC .......... *G06F 16/188* (2019.01); *G06F 16/184* (2019.01)

(58) Field of Classification Search
CPC .............................. G06F 16/188; G06F 16/184
USPC ......................................................... 707/822
See application file for complete search history.

(56) References Cited

U.S. PATENT DOCUMENTS

| | | | |
|---|---|---|---|
| 2004/0215637 A1 | 10/2004 | Kitamura et al. | |
| 2004/0267830 A1* | 12/2004 | Wong | H04L 67/1095 |
| 2006/0085488 A1 | 4/2006 | Kitsuregawa et al. | |
| 2023/0132303 A1* | 4/2023 | Woo | G06F 21/566 |
| | | | 726/23 |

FOREIGN PATENT DOCUMENTS

| | | |
|---|---|---|
| JP | 2004-318288 A | 11/2004 |
| JP | 2006-119822 A | 5/2006 |

* cited by examiner

*Primary Examiner* — Cam Y T Truong
(74) *Attorney, Agent, or Firm* — Volpe Koenig

(57) ABSTRACT

The invention provides a cloud data base system and a data management method that can reorganize a DB without stopping and without affecting business in a cloud. The cloud data base system includes a virtual machine provided by a cloud service, an object storage, and a volume configured to store a DB. When the DB is reorganized, the virtual machine switches an issue destination of an IO from a first pseudo device to a second pseudo device, and causes a replication function to create a replicated volume and causes the first pseudo device to reorganize the DB stored in the replicated volume, while causing the second pseudo device to continue to issue an IO to a replication source volume that is a volume storing the DB.

6 Claims, 20 Drawing Sheets

FIG. 3A

| PSEUDO DEVICE NAME | PSEUDO DEVICE NUMBER | ISSUE DESTINATION VOLUME | PSEUDO DEVICE PAIR | REPLICATION DESTINATION VOLUME |
|---|---|---|---|---|
| FIRST PSEUDO DEVICE | 1 | VOLUME M | SECOND PSEUDO DEVICE | — |
| SECOND PSEUDO DEVICE | 2 | — | FIRST PSEUDO DEVICE | — |

FIG. 3B

| PSEUDO DEVICE NAME | PSEUDO DEVICE NUMBER | ISSUE DESTINATION VOLUME | PSEUDO DEVICE PAIR | REPLICATION DESTINATION VOLUME |
|---|---|---|---|---|
| FIRST PSEUDO DEVICE | 1 | VOLUME M | SECOND PSEUDO DEVICE | — |
| SECOND PSEUDO DEVICE | 2 | VOLUME M | FIRST PSEUDO DEVICE | — |

CLOUD DATA BASE SYSTEM AND DATA MANAGEMENT METHOD

TECHNICAL FIELD

The present invention relates to a cloud data base system and a data management method.

BACKGROUND ART

A mission-critical system applied to financial, public, traffic, communication, and the like is an important system that supports social infrastructure and is not allowed to fail or stop. In a mission-critical system, a data base management system (DBMS) is used to safely store data and access necessary data at high speed. The DBMS is required to have high quality to support mission-critical.

In the DBMS, when the DBMS is operated for a long period of time, fragmentation of a data base (DB) occurs and performance is lowered, and therefore, it is necessary to periodically reorganize the DB. In order to achieve high quality required for DBMS of a mission-critical system, it is important to achieve a high-performance operation without stopping for 24 hours. In order to achieve such an operation, it is essential to carry out periodic reorganization for the DB without stopping business.

In on-premise, the DB can be reorganized without lowering performance of the DBMS. A method is as follows.
(1) Before the reorganization of the DB is started, the DBMS executes DB update processing in a volume #1. Data written in the volume #1 is also reflected in a volume #2 by a storage function.
(2) The DB update processing is stopped, and an IO is not issued to the volume #1. This is called quiescence.
(3) During the quiescence, the storage function makes the volume #1 and the volume #2 in a matched state where data is completely identical, and an IO can be issued to the volume #2.
(4) A volume for which the DB update processing is to be executed in the DBMS is switched to the volume #2.
(5) The quiescence is released, and the DB update processing is resumed in the volume #2. Also, recording of data update by an executed transaction is started (that is, recording of information related to data update is started).
(6) The DB stored in the volume #1 is reorganized.
(7) After the reorganization is completed, updated content is reflected in the volume #1 based on the information related to the data update recorded during the DB reorganization.
(8) At the same time with completion of the reflection, the DB is made quiescence, and the recording of the data update is stopped.
(9) A volume for which DB update processing is to be executed in the DBMS is switched to the volume #1.
(10) The quiescence is released, and the DB update processing is resumed in the volume #1.

On the other hand, on cloud, there is no volume replication function of storage used in the above-described reorganization method, and a volume replication function is provided by a different method. For example, when replicating an amazon elastic block store (EBS) which is a block device by amazon web services (AWS) serving as a cloud, the following procedure is executed.
(1) Stop a business application or the like that is using a replication source EBS, and do not update the replication source EBS.
(2) Create a snap shot of the replication source EBS in S3 (amazon simple storage service (amazon S3). It takes time to create this snap shot (for example, about 20 minutes is required to create a snap shot of an EBS of 100 GB).
(3) After creation of the snap shot is completed, create a new replicated EBS from the snap shot.

PTL 1 discloses a technique for enabling reorganization processing of a data base without stopping processing of a data base system in on-premise. PTL 2 discloses a technique capable of executing predetermined processing while continuing data base processing as much as possible in on-premise.

CITATION LIST

Patent Literature

PTL 1: JP2006-119822A
PTL 2: JP2004-318288A

SUMMARY OF INVENTION

Technical Problem

Transfer to a cloud for a mission-critical system is in progress. When the mission-critical system is transferred to a cloud, it is essential to perform periodic reorganization of a DB without stopping business and without affecting business.

In order to reorganize a DB without lowering performance of a DBMS, it is necessary to be capable of taking over business to a DB stored in a volume different from a volume in which a DB that is being reorganized is stored and updating the DB during the reorganization of the DB. Therefore, a mechanism for replicating a volume in a state where data is matched is required.

For example, when an EBS that stores a DB to be reorganized is replicated and reorganized using an AWS as a cloud, the following procedure is executed using an EBS snap shot.
(1) Bring a replication source EBS that stores a DB to be reorganized into a state where an IO is not issued from a DBMS that is being used, and data is not written to the replication source EBS that stores the DB to be reorganized.
(2) Create a snap shot of the replication source EBS that stores the DB to be reorganized in S3. It takes time to create this snap shot (for example, about 20 minutes is required to create a snap shot of an EBS of 100 GB).
(3) After creation of the snap shot is completed, create a new replicated EBS from the snap shot.
(4) After the replicated EBS is created, reorganize the DB of the replication source EBS, and during the reorganization, the DBMS uses the replicated EBS, and at the same time, start recording of data updated by an executed transaction (the data is recorded in, for example, the EBS).
(5) After the reorganization is completed, reflect the updated data recorded in the EBS in the replication source EBS, stop the recording of the data updated by the executed transaction, and the DBMS uses the replication source EBS.

However, since reading of data that is not transferred to the replicated EBS is slow immediately after the creation of the replicated EBS, performance of the DB is lowered, which affects business. That is, when an operation of creating the EBS is performed based on a snap shot in S3, the EBS is created immediately (within several seconds in an actual measurement), but data is not transferred to the EBS. The created EBS can be immediately attached (connected) to a virtual machine and used, but data is transferred from S3 to the virtual machine for an area read for the first time. Since the transfer from S3 is very slow as compared with transfer from the EBS, performance of a DB is lowered, which affects business. This problem may occur not only in the AWS but also in other cloud services.

Further, in replication using an EBS snap shot function, since a new EBS is created from a snap shot, it is necessary to perform setting for using the new EBS in the DBMS for every replication, and it is necessary to stop business. This problem may occur not only in the AWS but also in other cloud services.

Accordingly, in a cloud (the AWS and other cloud services), it is difficult to reorganize a DB without stopping and without affecting business.

PTL 1 and PTL 2 are techniques based on a premise of on-premise, and do not reorganize a DB using a cloud-specific replication function as in the invention.

The invention is made to solve the above problems. That is, an object of the invention is to provide a cloud data base system and a data management method that can reorganize a DB without stopping and without affecting business in a cloud.

Solution to Problem

In order to solve the above problems, a cloud data base system according to the invention is a cloud data base system provided by a cloud service, and includes a virtual computing environment, and a volume that is a block storage configured to store a data base, in which the virtual computing environment includes a data base management system configured to request an IO, a first pseudo device configured to receive the IO, issue the IO to the volume, and switch the volume that is an issue destination of the IO, and a second pseudo device configured to receive the IO, issue the IO to the volume, and switch the volume that is an issue destination of the IO, and the data base management system requests the IO to any one of the first pseudo device and the second pseudo device, and causes any one of the first pseudo device and the second pseudo device to issue the IO to the volume.

A data management method according to the invention is a data management method to be applied to a cloud data base system, and the cloud data base system is provided by a cloud service and includes a virtual computing environment and a volume that is a block storage configured to store a data base. The virtual computing environment includes a data base management system configured to request an IO, a first pseudo device configured to receive the IO, issue the IO to the volume, and switch the volume that is an issue destination of the IO, and a second pseudo device configured to receive the IO, issue the IO to the volume, and switch the volume that is an issue destination of the IO. The data management method including requesting the IO to any one of the first pseudo device and the second pseudo device, and causing any one of the first pseudo device and the second pseudo device to issue the IO to the volume, which is executed by the data base management system.

Advantageous Effects of Invention

According to the invention, it is possible to reorganize a DB without stopping and without affecting business in a cloud.

BRIEF DESCRIPTION OF DRAWINGS

FIG. 3A is a diagram illustrating a pseudo device management table.

FIG. 3B is a diagram illustrating the pseudo device management table.

DESCRIPTION OF EMBODIMENTS

Figure 1:
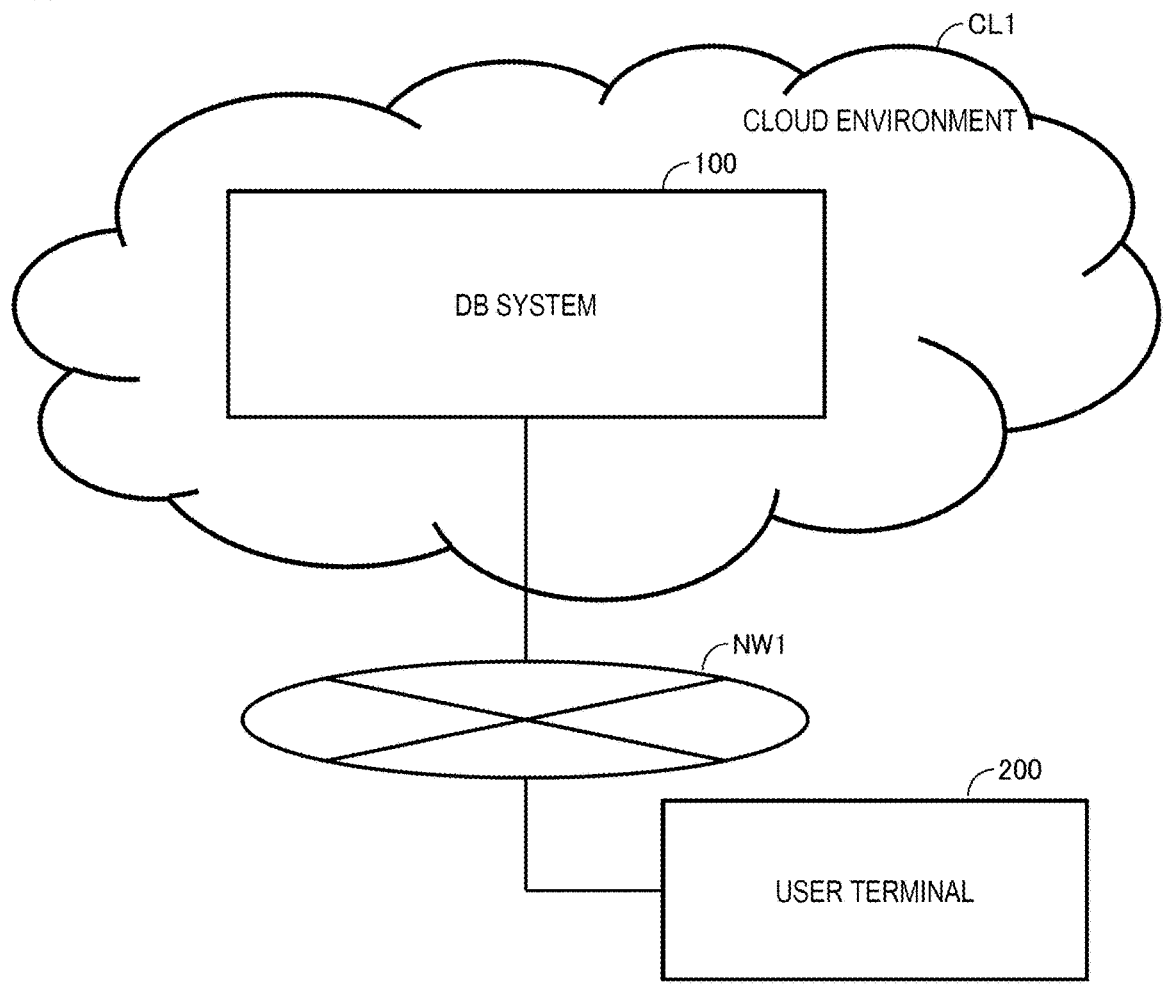
FIG. 1 is a diagram illustrating a configuration example of a system including a cloud data base system according to an embodiment of the invention.

Hereinafter, embodiments of the invention will be described with reference to the drawings. In the drawings of the embodiments, the same or corresponding parts may be denoted by the same reference numerals. In the following description, although various kinds of information may be described by expressions such as "table", "record", "column", and "row", the various kinds of information may be expressed by other data structures. Further, in the case of describing identification information, although expressions such as "number" and "name" are used, these expressions can be replaced with one another. Further, in the following description, although processing may be described using a functional block as a subject, the subject of the processing may be a CPU or a device instead of the functional block.

Embodiment

A system including a cloud data base system 100 (hereinafter referred to as a "DB system 100") according to an embodiment of the invention will be described. As illustrated in FIG. 1, the system includes a cloud environment CL1 and a user terminal 200. The cloud environment CL1 is an environment for providing a cloud service accessible through the Internet.

The cloud environment CL1 applies a virtualization technique to a physical resource (for example, a physical server, a physical storage device, and a physical network) to construct a virtual resource such as a virtual computing resource (for example, a virtual machine), a virtual storage resource (for example, a virtual storage), and a virtual communication resource (for example, a virtual network). The cloud service provides a virtual resource constructed in the cloud environment CL1 to a user of the cloud service.

The DB system 100 includes a virtual resource such as a virtual machine 110 and a volume 120 (see FIG. 2) provided by a cloud service, and a virtual network (not illustrated).

The user terminal 200 is a type of computer and is a terminal (a device) used by a user, such as a personal computer (PC). The user terminal 200 is a terminal for performing an operation such as maintenance and management of the DB system 100. The DB system 100 and the user terminal 200 are configured to communicate with each other via a network NW1 (Internet). A user can input information (for example, a script 150 (see FIG. 2)) to the DB system 100 via the user terminal 200 and perform maintenance work such as reorganization of a DB (data base) provided in the DB system 100.

Figure 2:
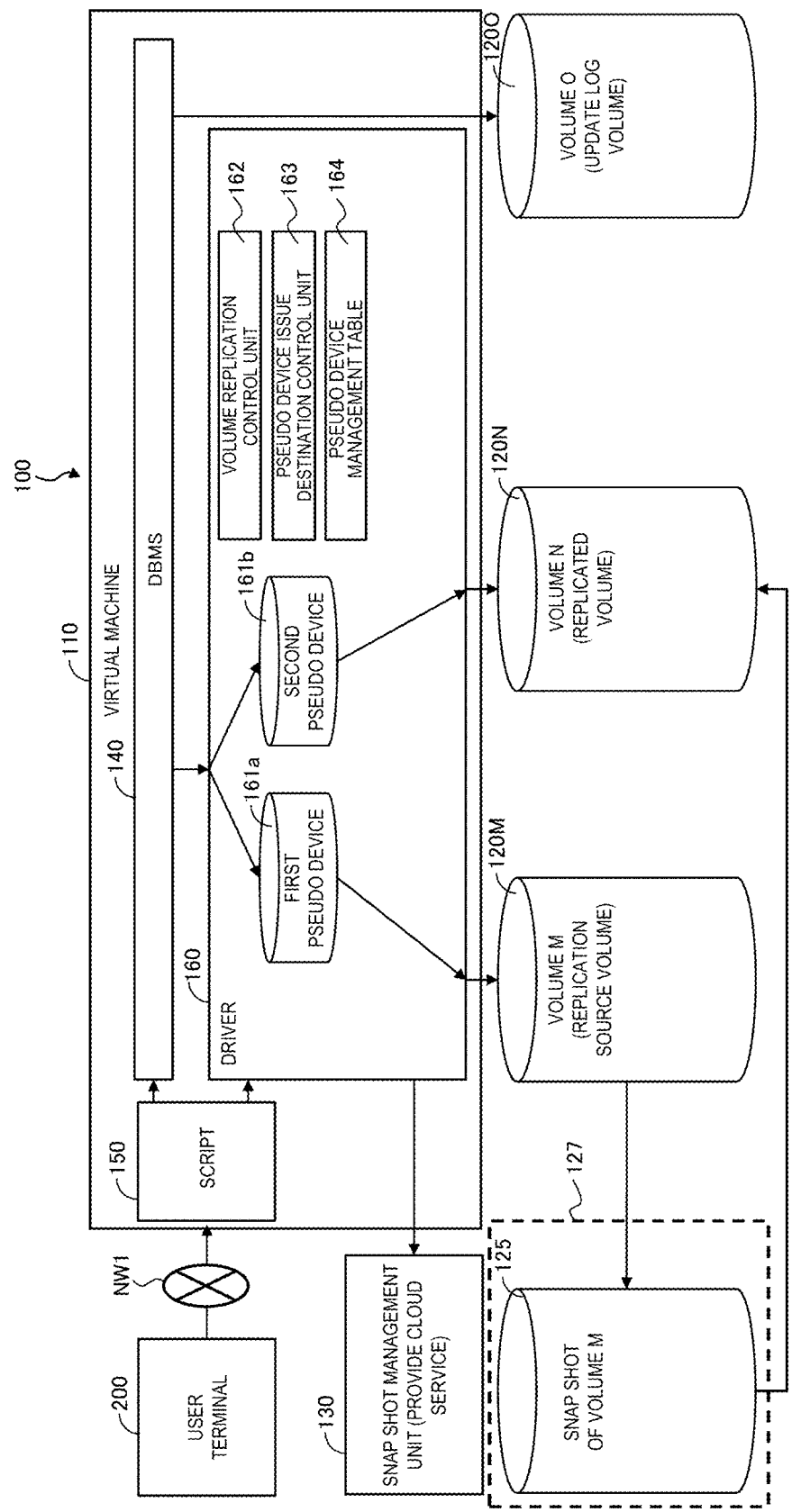
FIG. 2 is a diagram illustrating a system configuration example of the cloud data base system according to the embodiment of the invention.

FIG. 2 is a diagram illustrating a system configuration example of the DB system 100. As illustrated in FIG. 2, the DB system 100 includes the virtual machine 110, a volume M 120M, a volume O 120O, a volume N 120N created as necessary, and a snap shot 125 of the volume M 120M created as necessary. The virtual machine 110, the volume M 120M, the volume O 120O, the volume N 120N, and the snap shot 125 are connected to one another via a virtual network (not illustrated) so that information can be transmitted and received therebetween. The virtual machine 110 may be referred to as a "virtual computing environment". The volume M 120M, the volume N 120N, and the volume O 120O are referred to as the "volume 120" when it is not necessary to particularly distinguish them. The snap shot 125 may be referred to as a "data copy". The volume M 120M may be referred to as a "replication source volume". The volume N 120N may be referred to as a "replicated volume". The volume O 120O may be referred to as an "update log volume".

A name and an identification number (a volume number) for identifying each volume 120 are assigned to the volume 120. An identification number (a snap shot number) for identifying the snap shot 125 is assigned to the snap shot 125.

A snap shot management unit 130 manages a cloud service and is communicably connected to the virtual machine 110.

The volume 120 and the snap shot 125 that constitute the DB system 100 are created in the cloud environment CL1 by the snap shot management unit 130 by instructing the snap shot management unit 130 connected to the DB system 100 via a virtual network (not illustrated), and are provided as a cloud service. Each of the created volume 120 and the snap shot 125 can be deleted by the snap shot management unit 130 as necessary by instructing the snap shot management unit 130.

The virtual machine 110 is a virtual computer provided by the cloud service. The volume 120 which is a block storage is attached to the virtual machine 110. The virtual machine 110 includes a DBMS 140, the script 150, and a driver 160.

The DBMS 140 is a software system (a data base management system) for efficiently and safely managing data. The DBMS 140 provides a mechanism for storing data in a DB and performing operations such as searching, updating, and deleting data stored in the DB. The DBMS 140 manages a definition and a structure of data, and provides basic operations such as adding data to the DB, updating data in the DB, deleting data from the DB, and searching for data in the DB.

The script 150 is a program for executing specific processing for the DB system 100 to reorganize a DB. Details of the specific processing executed by the script 150 will be described later.

The driver 160 is a software component and includes a first pseudo device 161a, a second pseudo device 161b, a volume replication control unit 162, a pseudo device issue destination control unit 163, and a pseudo device management table 164.

The first pseudo device 161a is a virtual device that operates as a block device. The second pseudo device 161b is a virtual device that operates as a block device. The first pseudo device 161a and the second pseudo device 161b are referred to as a "pseudo device 161" when it is not necessary to particularly distinguish them.

The pseudo device 161 has a function of issuing, to the volume 120, an IO requested from the DBMS 140 to the pseudo device 161. The pseudo device 161 has a function of switching the volume 120 which is an issue destination of the requested IO in a state where the IO is requested from the DBMS 140 to the pseudo device 161.

The volume replication control unit 162 controls replication of the volume 120. The pseudo device issue destination control unit 163 controls an issue destination (the volume 120) of the IO of the pseudo device 161. Details of operations of the pseudo device 161, the volume replication control unit 162, and the pseudo device issue destination control unit 163 will be described later.

Figure 3C:
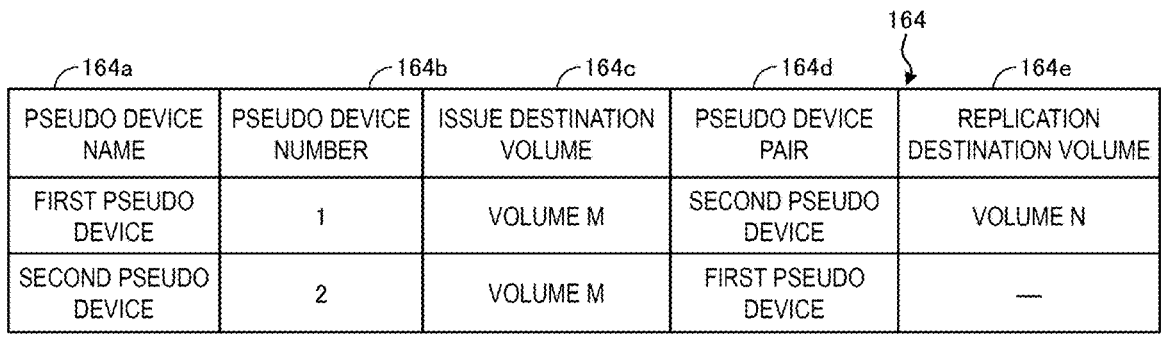
FIG. 3C is a diagram illustrating the pseudo device management table.
Figure 3D:
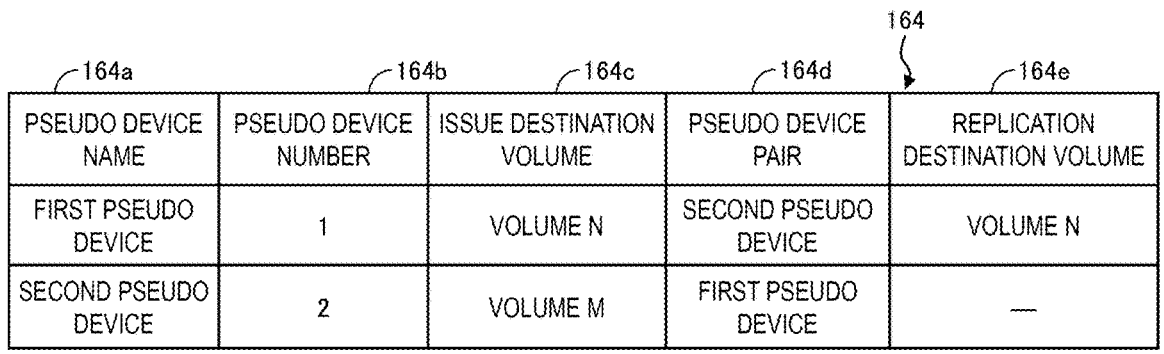
FIG. 3D is a diagram illustrating the pseudo device management table.
Figure 4:
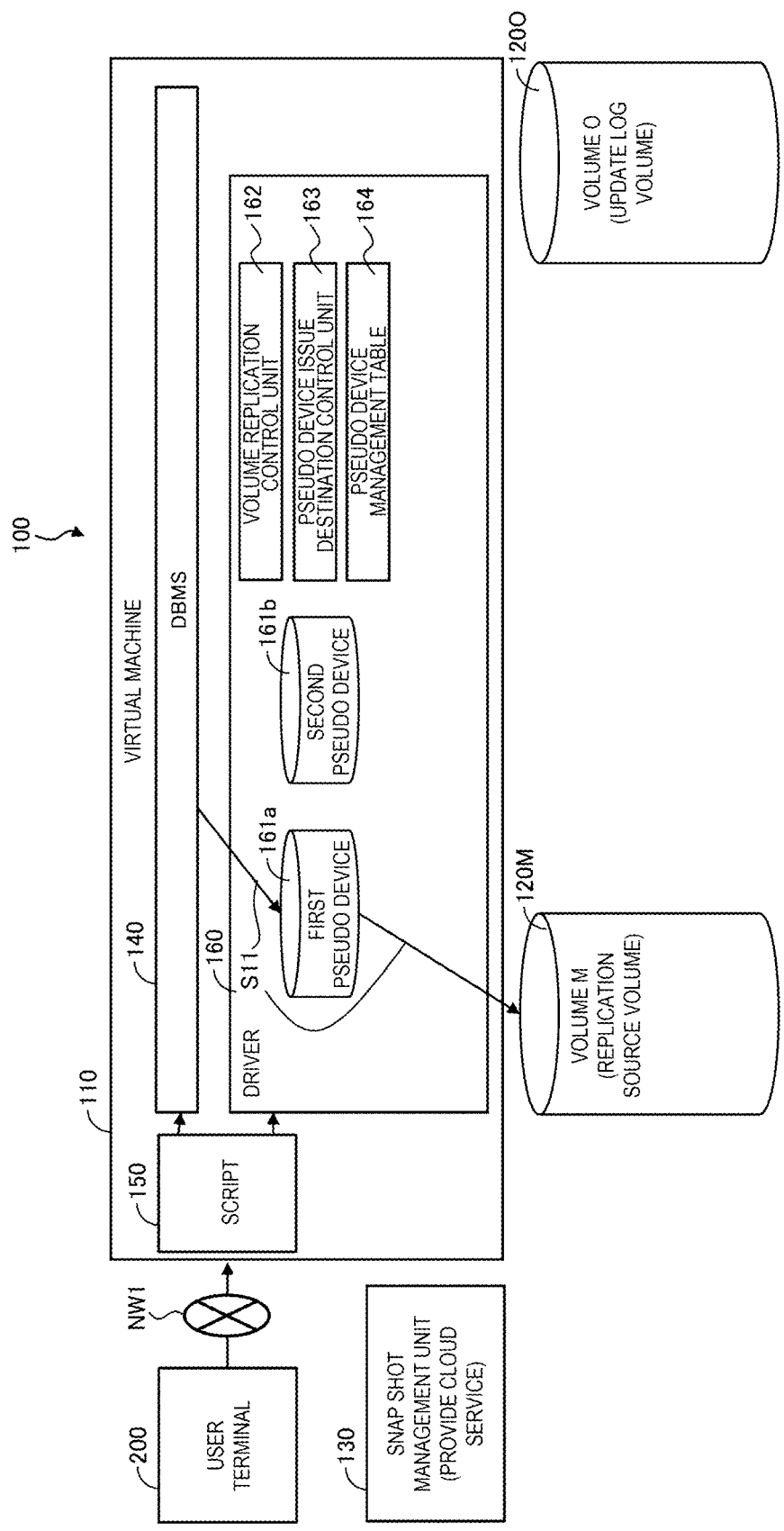
FIG. 4 is a diagram illustrating an overview of an operation when the cloud data base system reorganizes a DB.

The pseudo device management table 164 is information in a table format for managing the IO issue destination of the pseudo device 161. FIGS. 3A to 3D are diagrams illustrating the pseudo device management table 164. FIG. 3A illustrates the pseudo device management table 164 before executing reorganization processing. FIG. 3B illustrates the pseudo device management table 164 after information is rewritten from FIG. 3A. FIG. 3C illustrates the pseudo device management table 164 after information is rewritten from FIG. 3B. FIG. 3D illustrates the pseudo device management table 164 after information is rewritten from FIG. 3C.

Hereinafter, the pseudo device management table 164 illustrated in FIG. 3A will be described. The pseudo device management tables 164 illustrated in FIGS. 3B to 3D are the same as that illustrated in FIG. 3A, and description thereof is omitted.

As illustrated in FIG. 3A, the pseudo device management table 164 includes a pseudo device name 164a, a pseudo device number 164b, an issue destination volume 164c, a pseudo device pair 164d, and a replication destination volume 164e as columns for storing information (values). In the pseudo device management table 164, information corresponding to each column for managing the issue destination of the IO of the pseudo device 161 is associated with one another and stored as information (records) in units of rows.

Specifically, a name of the pseudo device 161 is stored in the pseudo device name 164a. A number for identifying the pseudo device 161 is stored in the pseudo device number 164b. A name of the volume 120 of the issue destination of the IO of the corresponding pseudo device 161 is stored in the issue destination volume 120. A name of the pseudo device 161 paired with the corresponding pseudo device 161 is stored in the pseudo device pair 164d. When there is the replicated volume 120 corresponding to the volume 120 stored in the issue destination volume 164c, a name of the volume 120 which is a replication destination (the replicated volume 120) corresponding to the volume 120 in the issue destination volume 164c is stored in the replication destination volume 164e (see FIG. 3C).

The pseudo device 161 refers to the pseudo device management table 164 and issues the IO requested from the DBMS 140 to the volume 120 associated with the pseudo device 161 as the issue destination volume 120. In the pseudo device management table 164, information (a value) stored in each column is rewritten by the volume replication control unit 162 and the pseudo device issue destination control unit 163. According to rewritten contents of the pseudo device management table 164, the pseudo device 161 switches the volume 120 to which the IO received by the volume 120 is issued.

Referring to FIG. 2 again, the volume 120 is a storage area provided by a block storage service of a cloud service. The snap shot 125 of the volume 120 is created in an object storage 127 by a replication function provided by the cloud service. The object storage 127 is provided by an object storage service of the cloud service.

<Overview>

The overview of the invention will be described. When a DB is to be reorganized, the DB system 100 replicates the replicated volume N 120N from the volume M 120M which is a DB to be reorganized, reorganizes the DB of the replicated volume N 120N, and then uses the DB of the replicated volume N 120N in business.

When replicating the volume M 120M for reorganizing the DB, the DB system 100 creates the snap shot 125 of the replication source volume M 120M and creates the new volume N 120N (the replicated volume N 120N) from the snap shot 125. Here, when the DB system 100 does not include the driver 160 (the first pseudo device 161a and the second pseudo device 161b), the DBMS 140 needs to register the replicated volume N 120N in the DBMS 100 in order to use the replicated volume N 120N in reorganization of the DB and business. Therefore, when the DB system 100 does not include the driver 160, it is necessary to perform setting (registration work) for the DBMS 140 in order to use the newly created replicated volume N 120N in reorganization and business each time replication is performed, which takes time and effort, and it is necessary to stop business during this period.

Here, the DB system 100 includes the driver (the first pseudo device 161a and the second pseudo device). Accordingly, the DBMS 140 can perform control to request an IO from the DBMS 140 to any one of the first pseudo device 161a and the second pseudo device 161b without registering the volume 120 in the DBMS 140, and cause any one of the first pseudo device 161a and the second pseudo device 161b to process the IO to the volume 120. Therefore, the DB system 100 can use the replicated volume N 120N in reorganization of the DB and business without the need to register the volume 120 in the DBMS 140.

For the replicated volume N 120N created from the snap shot 125, since reading of an un-transferred area from the snap shot 125 is slow immediately after the replication is completed, performance of the DB may be lowered. Therefore, when the replicated volume N 120N is used in business immediately after the replication is completed, it may affect the business.

During replication and reorganization, the DB system 100 performs control to cause the first pseudo device 161a to process an IO of reorganization to the volume N 120N which is a replication destination, while causing the second pseudo device 161b to process an IO of business to the volume M 120M which is a replication source.

Accordingly, the DB system 100 can perform volume replication and DB reorganization for reorganizing a DB without lowering performance of the DB while processing an IO of business during replication and reorganization without using the replicated volume 120 in business immediately after replication.

FIGS. 4 to 7 are diagrams illustrating an overview of an operation when the DB system 100 reorganizes a DB. The DB system 100 operates in order of S11 to S25 as described below.

(FIG. 4: S11)

S11: In the DB system 100, the DBMS 140 requests an IO to the first pseudo device 161a in response to a request from a business application during normal business (a normal business state) before starting DB reorganization. The driver 160 performs control to issue, to the volume M 120M, the IO requested from the DBMS 140 to the first pseudo device 161a.

Figure 5:
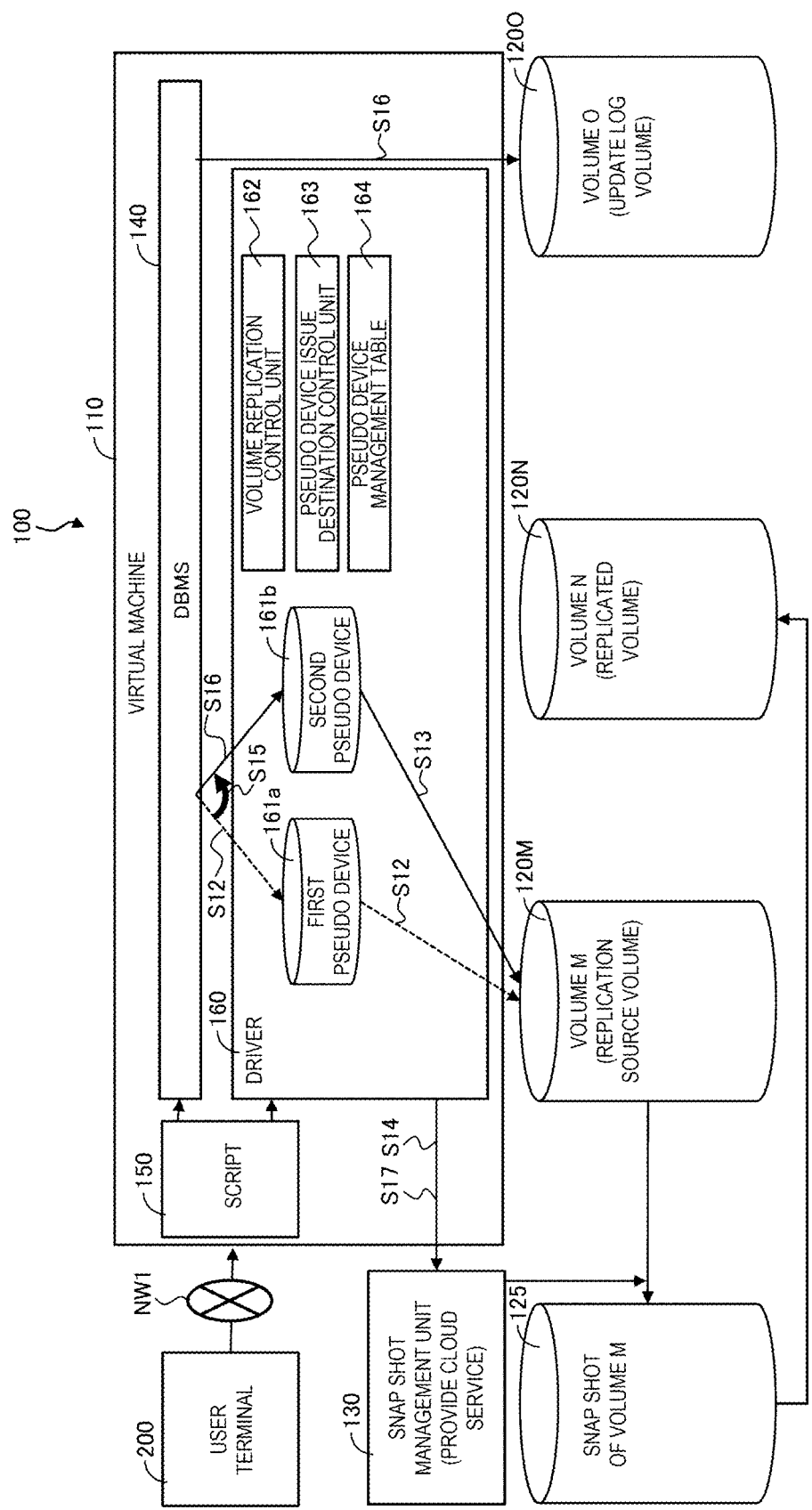
FIG. 5 is a diagram illustrating an overview of an operation when the cloud data base system reorganizes the DB.

(FIG. 5: S12 to S17)

S12: The DBMS 140 makes the DB quiescence. The quiescence of the DB refers to that update processing of a DB in progress is completed and new update is prohibited.

S13: The driver 160 performs setting to issue, to the volume M 120M, an IO requested to the second pseudo device 161b.

S14: The driver 160 instructs the snap shot management unit 130 to create the snap shot 125 of the volume M 120M.

S15: After the driver 160 instructs the creation of the snap shot 125, the DBMS 140 switches a DB to be updated in business from the first pseudo device 161a to the second pseudo device 161b and sets the second pseudo device 161b as the DB to be updated in business without waiting for the completion of the creation of the snap shot 125.

S16: The DBMS 140 resumes business in the second pseudo device 161b by releasing the DB quiescence. When the DBMS 140 releases the DB quiescence, the DBMS 140 requests an IO corresponding to the request of the business application to the second pseudo device 161b, and the second pseudo device 161b issues the IO to the volume M 120M set in S13. The DBMS 140 starts recording a log of an update IO request to the DB in the volume O 120O at the same time with the release of the quiescence.

S17: After the creation of the snap shot 125 is completed, the driver 160 instructs the snap shot management unit 130 to create the volume N 120N from the snap shot 125.

Figure 6:
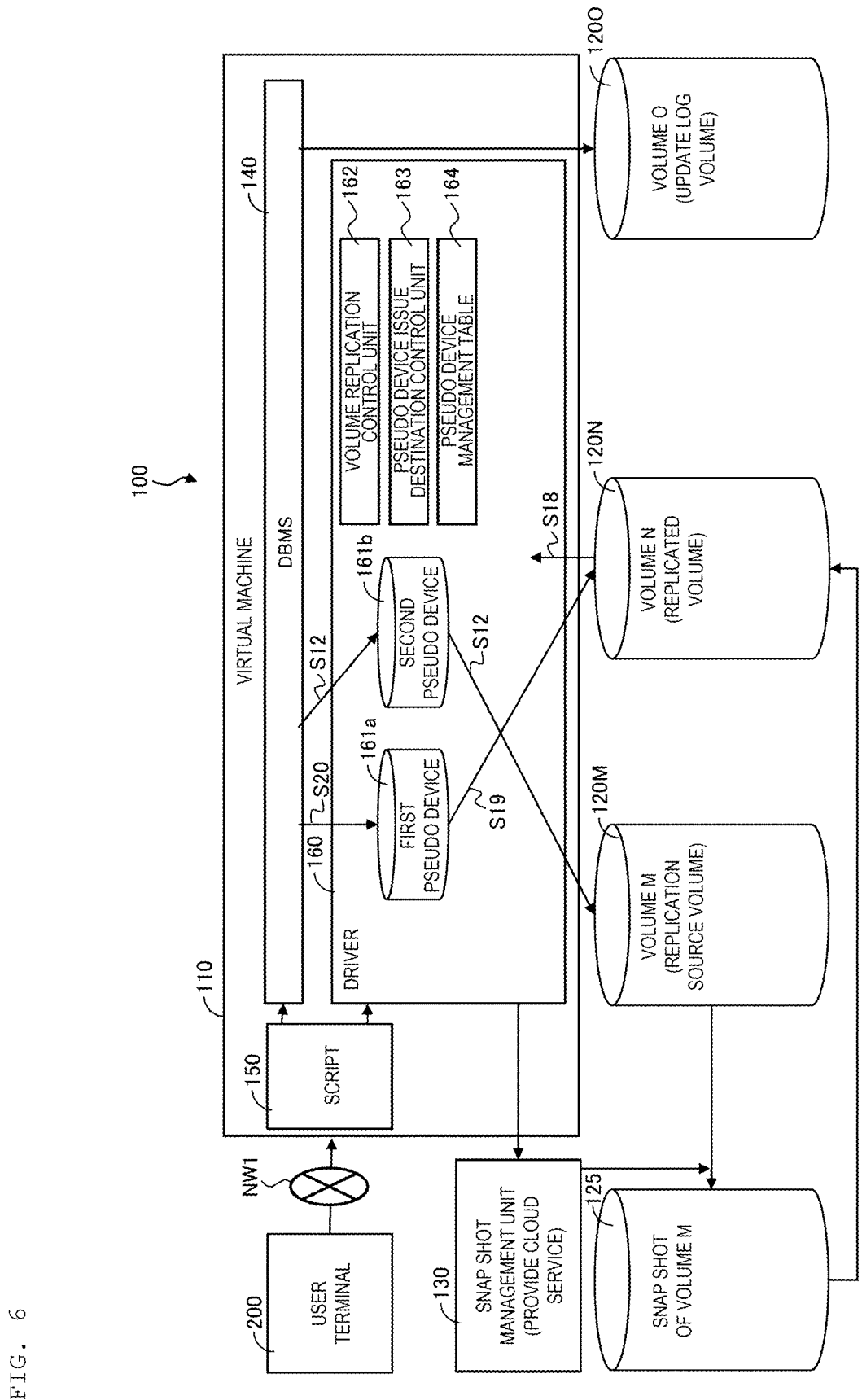
FIG. 6 is a diagram illustrating an overview of an operation when the cloud data base system reorganizes the DB.

(FIG. 6: S18 to S20)

S18: The driver 160 reads the entire area of a storage area of the volume N 120N to transfer data of the entire area of the storage area from the snap shot 125 to the volume N 120N. Accordingly, thereafter, when data is read from the volume N 120N, it is not necessary to transfer data from the snap shot 125, and thus it is possible to avoid a slowdown in reading of data from the volume N 120N.

S19: The driver 160 performs setting to issue, to the volume N 120N, an IO requested to the first pseudo device 161a.

S20: The DBMS 140 reorganizes a DB of the first pseudo device 161a (a DB stored in the volume N 120N) (releases fragmentation of the DB).

Figure 7:
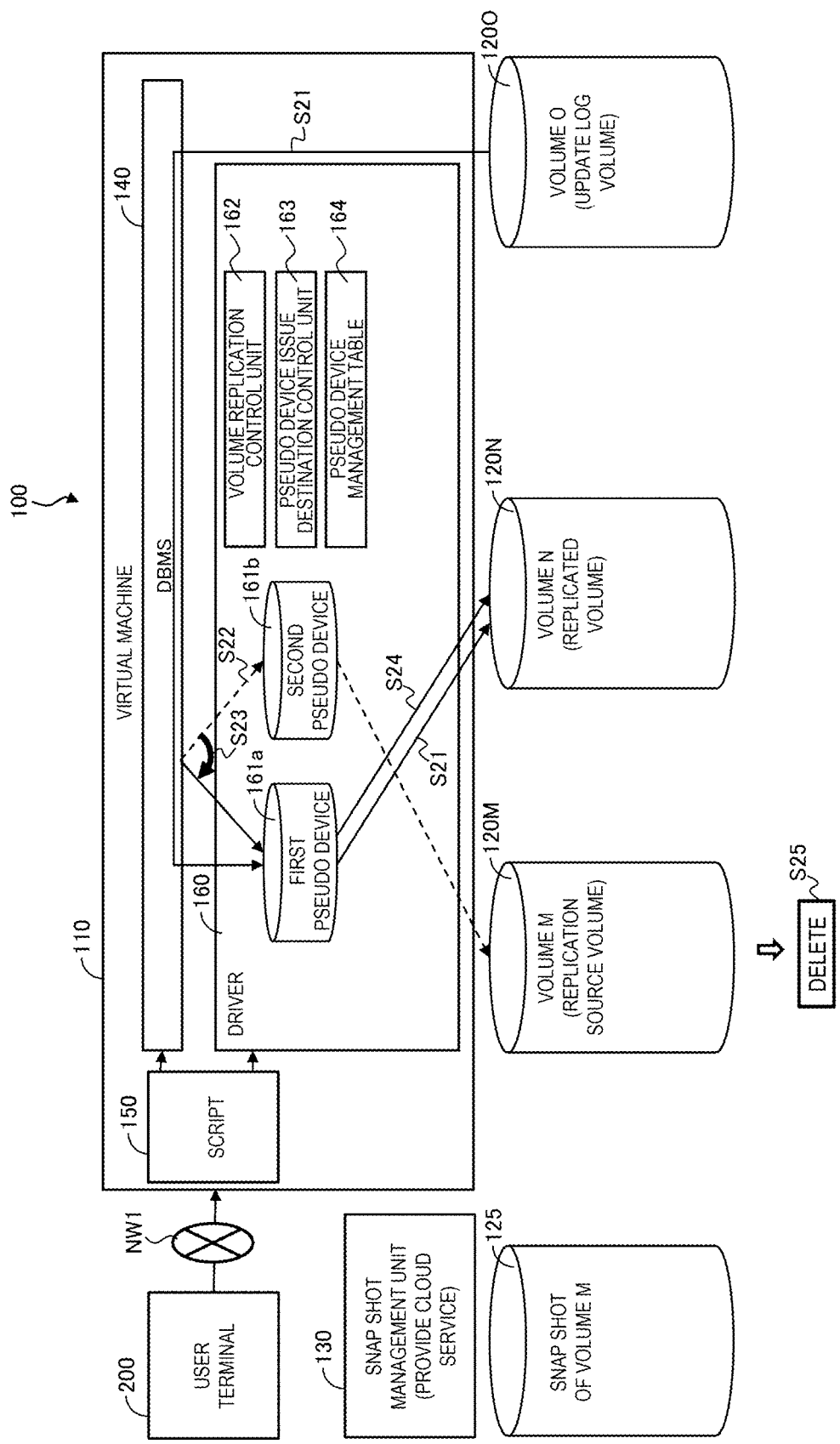
FIG. 7 is a diagram illustrating an overview of an operation when the cloud data base system reorganizes the DB.

(FIG. 7: S21 to S25)

S21: After the reorganization is completed, the DBMS 140 reflects, in the first pseudo device 161a, an update log of the DB recorded in the volume O 120O during the reorganization.

S22: After the reflection of the update log is completed, the DBMS 140 makes the DB quiescence, and ends the recording of the update log of the DB in the volume O 120O.

S23: The DBMS 140 switches a DB to be updated in business by the DBMS 140 from the second pseudo device 161b to the first pseudo device 161a, and sets the first pseudo device 161a as the DB to be updated in business.

S24: The DBMS 140 resumes business in the first pseudo device 161a by releasing the DB quiescence.

S25: The script 150 instructs the snap shot management unit 130 via the driver 160 to cause the snap shot management unit 130 to delete the volume M 120M that is no longer required.

<Specific Operation>

Figure 8:
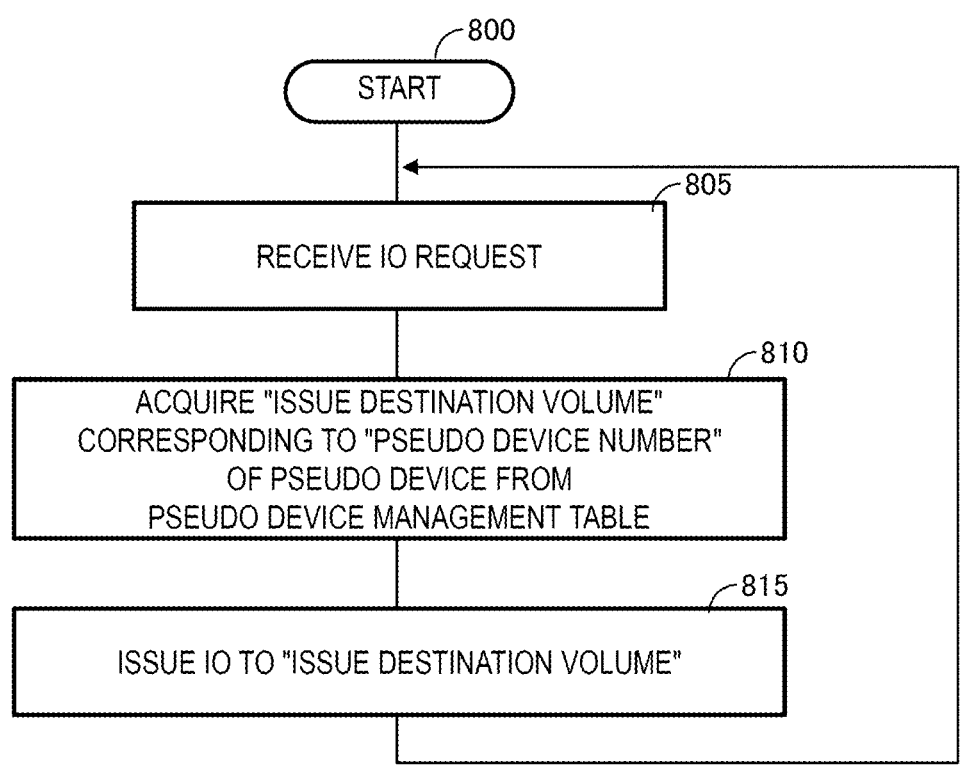
FIG. 8 is a flowchart illustrating a processing flow executed by a pseudo device.

FIG. 8 is a flowchart illustrating a processing flow executed by the pseudo device 161. In the DB system 100, the pseudo device 161 processes an IO by executing the processing flow illustrated in FIG. 8 and issuing an IO request from the DBMS 140 to the volume 120.

The pseudo device 161 starts the processing from step 800, executes processing from step 805 to step 815 in order as described below, and then returns the processing to step 805.

Step 805: The pseudo device 161 receives an IO request from the DBMS 140.

Step 810: The pseudo device 161 acquires, as the volume 120 which is an IO issue destination, the volume 120 in the issue destination volume 164c corresponding to a number in the pseudo device number 164b corresponding to the pseudo device 161 from the pseudo device management table 164.

Step 815: The pseudo device 161 issues an IO to the volume 120 which is the IO issue destination acquired in step 810.

Figure 9:
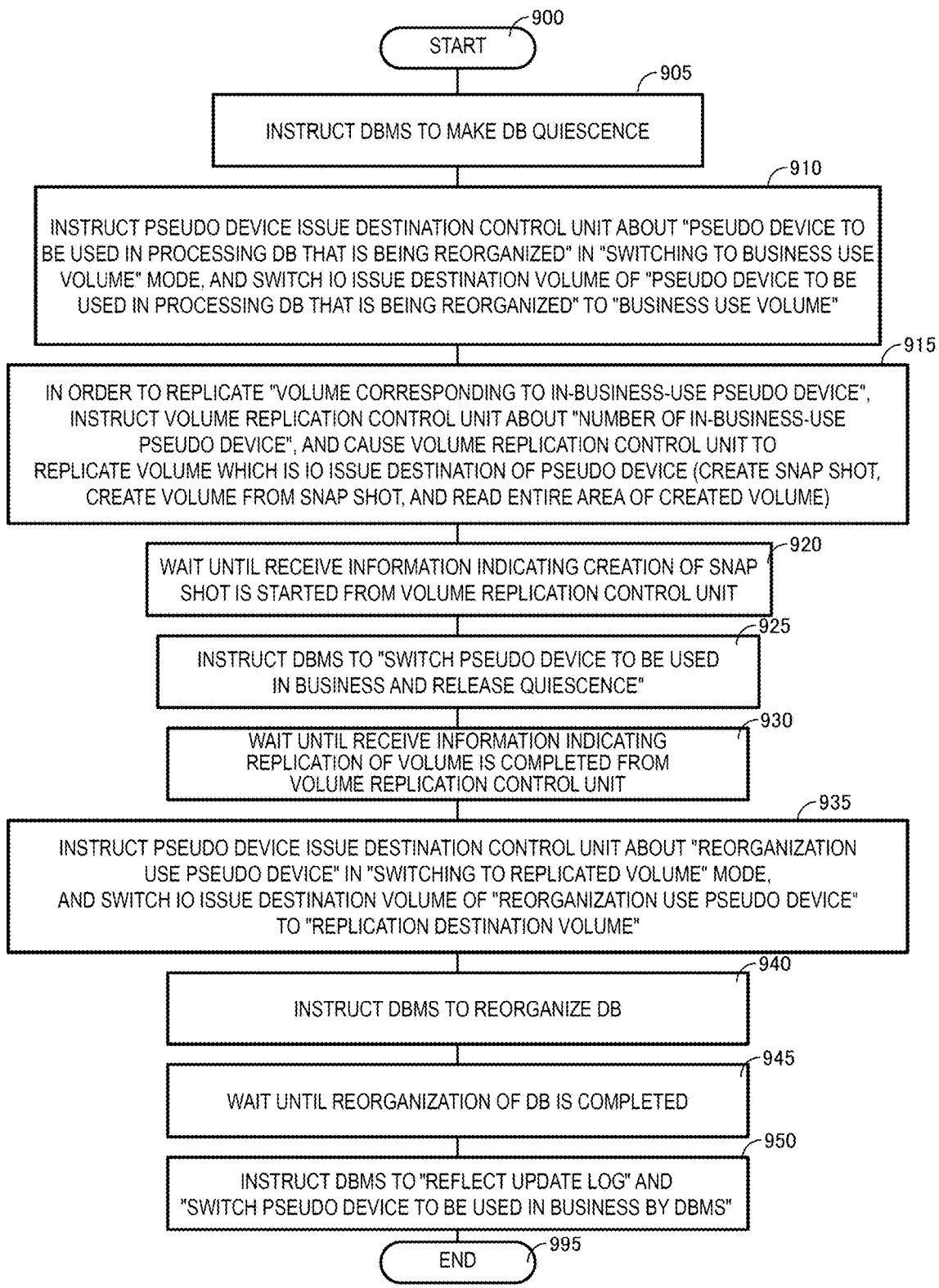
FIG. 9 is a flowchart illustrating a processing flow executed by a script.

FIG. 9 is a flowchart illustrating a processing flow when reorganization executed by the script 150 is performed.

When a user operates the user terminal 200 to issue an instruction for reorganizing a DB from the user terminal 200 to the virtual machine 110, the script 150 executes the processing flow illustrated in FIG. 9.

The script 150 starts the processing from step 900, executes processing from step 905 to step 950 in order as described below, then proceeds the processing to step 995, and temporarily ends the present processing flow.

Step 905: The script 150 instructs the DBMS 140 to make the DB quiescence.

Step 910: The script 150 instructs the pseudo device issue destination control unit 163 about a "pseudo device to be used in processing a DB that is being reorganized" to which the issue destination volume 120 is to be switched in a "switching to a business use volume" mode.

The "business use volume" is a volume (the volume M 120M) that is being used in business by the DBMS 140 at a current time. The script 150 transmits, to the pseudo device issue destination control unit 163, a value ("0") indicating the "switching to a business use volume mode" and a number (2) indicating a "pseudo device to be used in processing a DB that is being reorganized (the second pseudo device 161b)", thereby instructing the pseudo device issue destination control unit 163 about the "switching to a business use volume mode" and the "pseudo device to be used in processing a DB that is being reorganized". Upon receiving the instruction, the pseudo device issue destination control unit 163 executes a processing flow illustrated in FIG. 10 to be described later.

Accordingly, the script 150 operates the pseudo device issue destination control unit 163 such that the pseudo device issue destination control unit 163 switches the IO issue destination volume 120 of the second pseudo device 161b to the "business use volume (the volume M 120M)".

Step 915: In order to replicate a volume (the volume M 120M) corresponding to an in-business-use pseudo device (the first pseudo device 161a), the script 150 instructs the volume replication control unit 162 about a "number (1) of the in-business-use pseudo device (the first pseudo device 161a)". The in-business-use pseudo device is a pseudo device that is being used in business by the DBMS 140 at a current time (the first pseudo device 161a that is a request destination of an IO from the DBMS 140 at a current time). Upon receiving the instruction, the volume replication control unit 162 executes a processing flow illustrated in FIG. 11 to be described later.

Accordingly, the script 150 causes the volume replication control unit 162 to replicate the volume N 120N which is an IO issue destination (an IO issue destination after reorganization) of the first pseudo device 161a (create the snap shot 125, create the volume N 120N from the snap shot 125, and read the entire area of the created volume N 120N).

Step 920: The script 150 waits until the script 150 receives information indicating that creation of the snap shot 125 is started from the volume replication control unit 162.

Step 925: The script 150 instructs the DBMS 140 to "switch the pseudo device to be used in business and release the quiescence". Upon receiving the instruction, the DBMS 140 executes a processing flow illustrated in FIG. 16 to be described later.

Accordingly, the script 150 causes the DBMS 140 to switch the pseudo device to be used in business from the in-business-use pseudo device 161 (the first pseudo device 161a) to the second pseudo device 161b, to release the quiescence of the DB, and to start recording an update log.

Step 930: The script 150 waits until the script 150 receives information indicating that the replication of the volume N 120N is completed from the volume replication control unit 162.

Step 935: The script 150 instructs the pseudo device issue destination control unit 163 about a "reorganization use pseudo device (the first pseudo device 161a)" to which the issue destination volume 120 is to be switched in a "switching to a replicated volume" mode. The reorganization use pseudo device is a pseudo device (the first pseudo device 161a) to be used in reorganization of a DB.

The script 150 transmits to, the pseudo device issue destination control unit 163, a value ("1") indicating the "switching to a replicated volume" mode and a number (1) indicating the "reorganization use pseudo device (the first pseudo device 161a", thereby instructing the pseudo device issue destination control unit 163 about the "switching to a replicated volume" mode and the "reorganization use pseudo device".

Upon receiving the instruction, the pseudo device issue destination control unit 163 executes a processing flow illustrated in FIG. 10 to be described later.

Accordingly, the script 150 operates the pseudo device issue destination control unit 163 such that the pseudo device issue destination control unit 163 switches the IO issue destination volume 120 of the first pseudo device 161a to the volume N 120N which is a replication destination.

Step 940: The script 150 instructs the DBMS 140 to reorganize a DB. Upon receiving the instruction, the DBMS 140 executes a processing flow illustrated in FIG. 17 to be described later. Accordingly, the script 150 causes the DBMS 140 to reorganize a DB.

Step 945: The script 150 waits until the reorganization of the DB is completed.

Step 950: The script 150 instructs the DBMS 140 to "reflect an update log" and "switch a pseudo device to be used in business by the DBMS 140". Upon receiving the instruction, the DBMS 140 executes a processing flow illustrated in FIG. 18 to be described later.

Accordingly, the script 150 causes the DBMS 140 to "reflect an update log", and to switch the pseudo device 161 to be used in business by the DBMS 140 from the second pseudo device 161b to the first pseudo device 161a.

Figure 10:
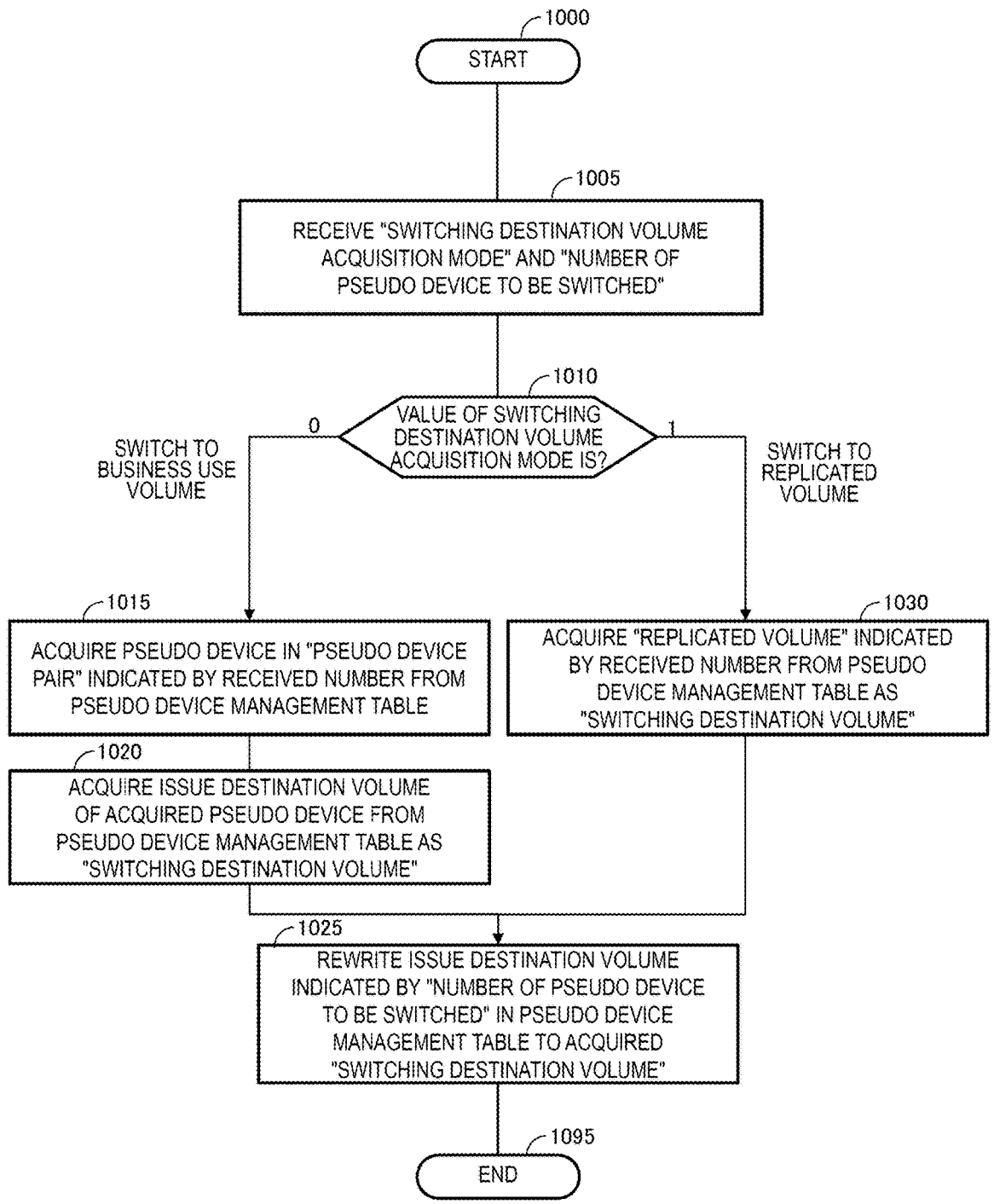
FIG. 10 is a flowchart illustrating a processing flow executed by a pseudo device issue destination control unit.

FIG. 10 is a flowchart illustrating a processing flow executed by the pseudo device issue destination control unit 163. When an instruction of a "switching destination volume acquisition" mode and a pseudo device to be switched (step 910 or step 935 in FIG. 9) is received from the script 150, the pseudo device issue destination control unit 163 starts the processing from step 1000, proceeds the processing to step 1005, and receives the "switching destination volume acquisition" mode and the "number of the pseudo device to be switched" from the script 150.

When a value indicating the "switching destination volume acquisition" mode is "0", the pseudo device issue destination control unit 163 executes the processing from step 1015 to step 1025 in order as described below, then proceeds the processing to step 1095, and temporarily ends the present processing flow.

Step 1015: the pseudo device issue destination control unit 163 acquires, from the pseudo device management table 164 illustrated in FIG. 3A, a name of a pseudo device (the first pseudo device) stored in the pseudo device pair 164d corresponding to the received number (2) of a pseudo device.

Step 1020: the pseudo device issue destination control unit 163 acquires, as a "switching destination volume", a name of the volume 120 (the volume M) stored in the issue destination volume 164c corresponding to the name of the pseudo device (the first pseudo device) acquired in step 1015 from the pseudo device management table 164 illustrated in FIG. 3A.

Step 1025: The pseudo device issue destination control unit 163 rewrites a value in the issue destination volume 164c corresponding to the "value (2) in the pseudo device number 164b for switching an issue destination" in the pseudo device management table 164 illustrated in FIG. 3A to the name (the volume M) of the "switching destination volume" acquired in step 1020 as illustrated in FIG. 3B. Accordingly, a volume which is an IO issue destination of the second pseudo device 161b whose IO issue destination is to be switched is set to be the volume M 120M (a business use volume). In a case where the processing flow illustrated in FIG. 8 is executed after the rewriting, when the second pseudo device 161b receives an IO request (step 805 in FIG. 8), in step 810, the second pseudo device 161b refers to the pseudo device management table 164 illustrated in FIG. 3B, acquires the volume M 120M as the issue destination volume 120, and issues an IO to the volume M 120M.

When a value indicating the "switching destination volume acquisition" mode is "1", the pseudo device issue destination control unit 163 executes the processing step 1030 and step 1025 in order as described below, then proceeds the processing to step 1095, and temporarily ends the present processing flow.

Step 1030: the pseudo device issue destination control unit 163 acquires, as a "switching destination volume", a name (a volume N) in the "replication destination volume 164e" corresponding to the received number (1) of a pseudo device from the pseudo device management table 164 illustrated in FIG. 3C. The pseudo device management table 164 illustrated in FIG. 3C is the pseudo device management table 164 after the pseudo device management table 164 illustrated in FIG. 3B is rewritten by processing in step 1145 in FIG. 11 which will be described later.

Step 1025: The pseudo device issue destination control unit 163 rewrites the issue destination volume 164c corresponding to the "number (1) of the pseudo device to be switched" in the pseudo device management table illustrated in FIG. 3C to the name (the volume N) of the "switching destination volume" acquired in step 1030 as illustrated in FIG. 3D. Accordingly, a volume which is an IO issue destination of the first pseudo device 161a whose IO issue destination is to be switched is set to be the volume N 120N (a replicated volume). In a case where the processing flow illustrated in FIG. 8 is executed after the rewriting, when the first pseudo device 161a receives an IO request (step 805 in FIG. 8), in step 810, the first pseudo device 161a refers to the pseudo device management table 164 illustrated in FIG. 3D, acquires the volume N 120N as the issue destination volume 120, and issues an IO to the volume N 120N.

Figure 11:
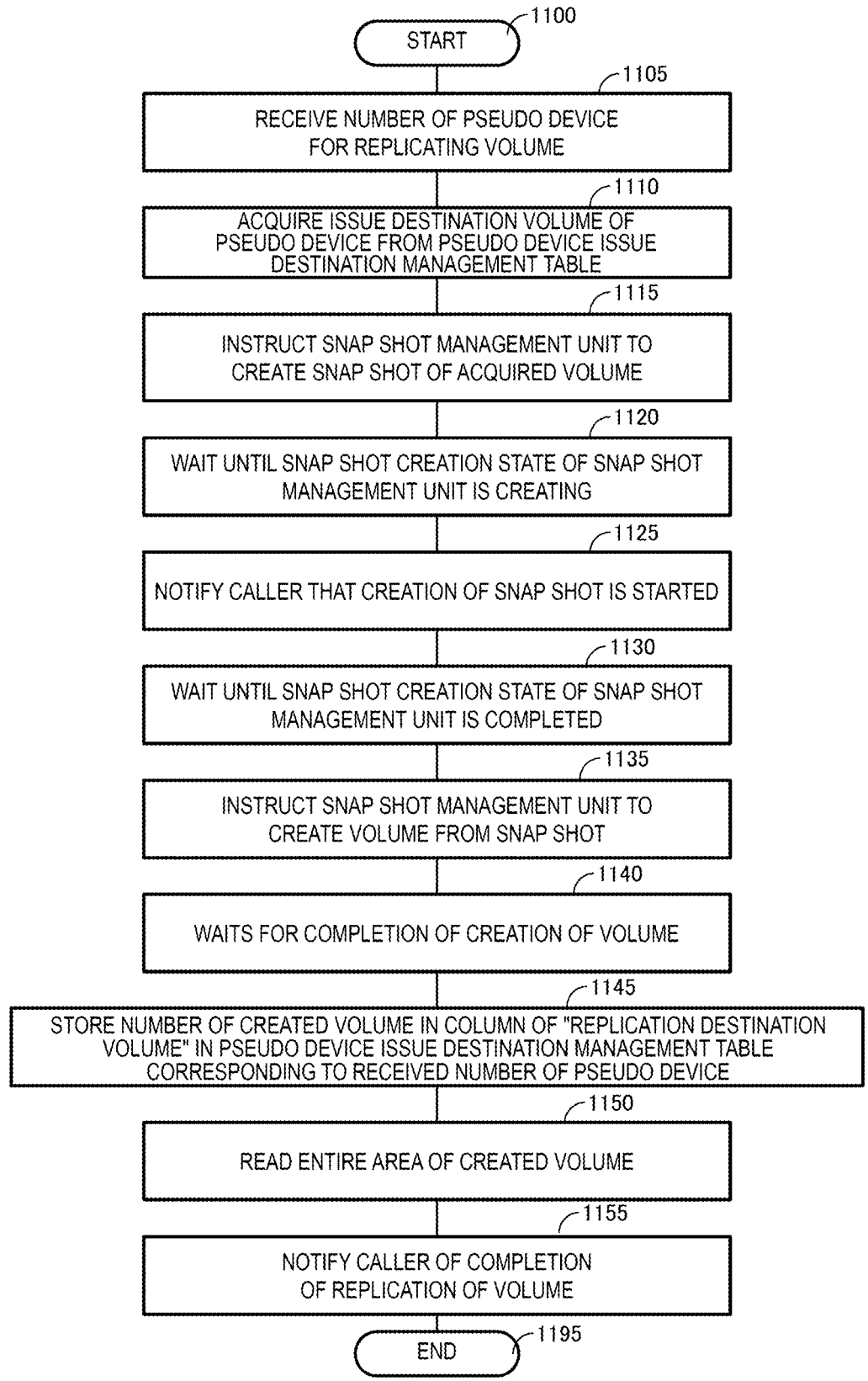
FIG. 11 is a flowchart illustrating a processing flow executed by a volume replication control unit.

FIG. 11 is a flowchart illustrating a processing flow executed by the volume replication control unit 162. When the volume replication control unit 162 receives an instruction to replicate the volume 120 from the script 150 (step 915 in FIG. 9), the volume replication control unit 162 starts the processing from step 1100, executes the processing from step 1105 to step 1155 in order as described below, then proceeds the processing to step 1195, and temporarily ends the present processing flow.

Step 1105: The volume replication control unit 162 receives the number (1) of the pseudo device for replicating the volume 120.

Step 1110: The volume replication control unit 162 acquires the issue destination volume 120 (the volume M 120M) corresponding to the pseudo device 161 (the first pseudo device 161a) from the pseudo device management table 164.

Step 1115: The volume replication control unit 162 instructs the snap shot management unit 130 to create the snap shot 125 of the volume 120 (the volume M 120M) acquired in step 1110. Upon receiving the instruction, the snap shot management unit 130 executes a processing flow illustrated in FIG. 12 to be described later. Accordingly, the volume replication control unit 162 causes the snap shot management unit 130 to create the snap shot 125 of the volume 120 (the volume M 120M).

Step 1120: The volume replication control unit 162 waits until a snap shot creation state of the snap shot management unit 130 is "creating".

Step 1125: The volume replication control unit 162 notifies a caller that creation of the snap shot 125 is started.

Step 1130: The volume replication control unit 162 waits until a snap shot creation state of the snap shot management unit 130 is completed.

Step 1135: The volume replication control unit 162 instructs the snap shot management unit 130 to create the volume 120 (the volume N 120N) from the snap shot 125. Upon receiving the instruction, the snap shot management unit 130 executes a processing flow illustrated in FIG. 13 to be described later. Accordingly, the volume replication control unit 162 causes the snap shot management unit 130 to create the volume N 120N from the snap shot 125.

Step 1140: The volume replication control unit 162 waits for completion of the creation of the volume (the volume N).

Step 1145: The volume replication control unit 162 stores a name of the created volume (the volume N) in the replication destination volume 164e of the pseudo device management table 164 corresponding to the number (1) of a pseudo device received in step 1105. Accordingly, the pseudo device management table 164 is rewritten from the state illustrated in FIG. 3B to the state illustrated in FIG. 3C.

Step 1150: The volume replication control unit 162 reads the entire area of the created volume 120 (the volume N 120N). The reason for executing this processing is to avoid a situation in which there is an area where data from the snap shot 125 is not transferred in the volume N 120N immediately after the replication and reading of data from the volume N 120N is slow as described above. When the volume replication control unit 162 reads the entire area of the volume N 120N immediately after the replication, data of the entire area is transferred from the snap shot 125. Thereafter, when data is read from the volume N 120N, it is not necessary to transfer data from the snap shot 125, and thus it is possible to avoid a slowdown in reading data from the volume N 120N.

Step 1155: The volume replication control unit 162 notifies a caller that the creation of the replicated volume N 120N is completed.

Figure 12:
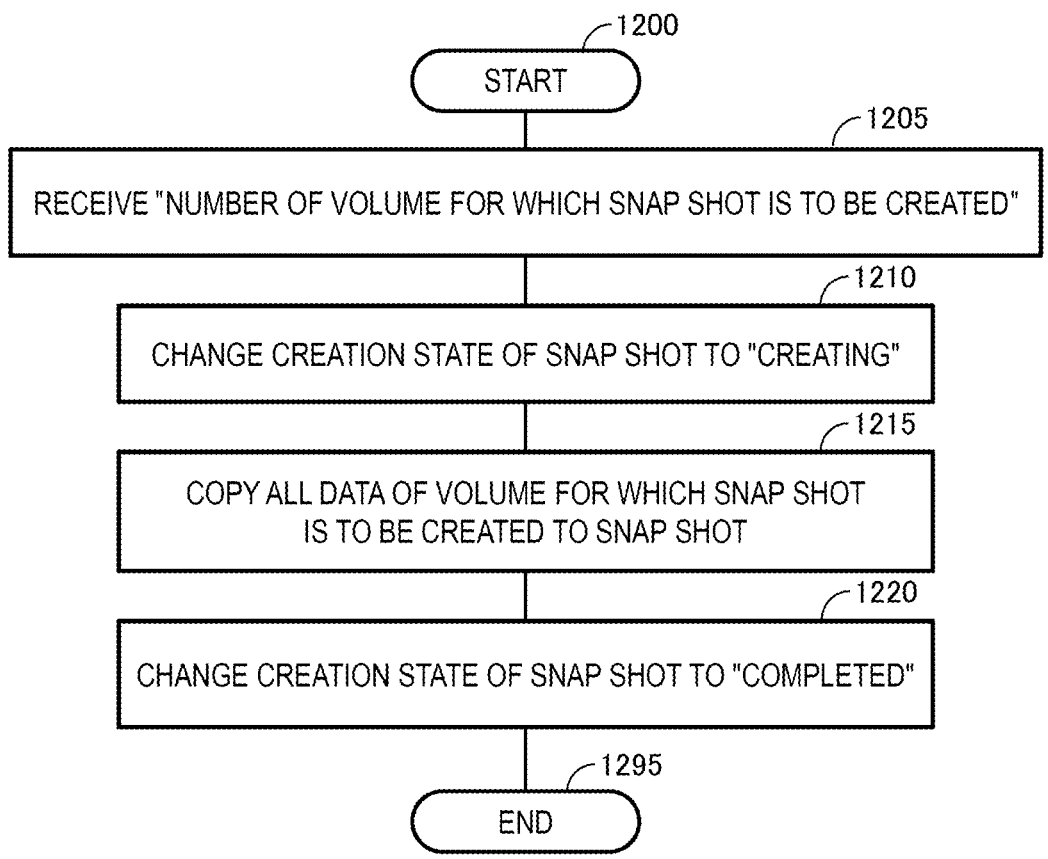
FIG. 12 is a flowchart illustrating a processing flow executed by a snap shot management unit.

FIG. 12 is a flowchart illustrating a processing flow of snap shot creation processing executed by the snap shot management unit 130. When the snap shot management unit 130 receives an instruction to create the snap shot 125 (step 1115 in FIG. 11) from the volume replication control unit 162, the snap shot management unit 130 starts the processing from step 1200, executes the processing from step 1205 to step 1220 in order as described below, then proceeds the processing to step 1295, and temporarily ends the present processing flow.

Step 1205: The snap shot management unit 130 receives a "number of a volume for which the snap shot 125 is to be created".

Step 1210: The snap shot management unit 130 changes a creation state of the snap shot 125 to "creating".

Step 1215: The snap shot management unit 130 copies all data of the volume 120 for which a snap shot is to be created to the snap shot 125.

Step 1220: The snap shot management unit 130 changes a creation state of the snap shot 125 to "completed".

Figure 13:
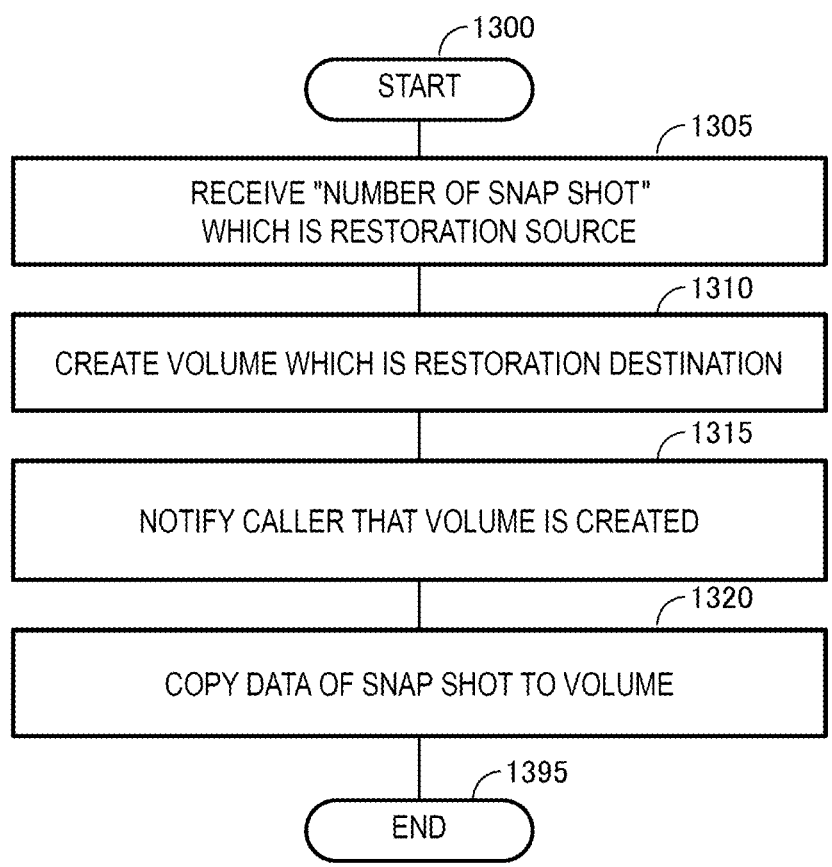
FIG. 13 is a flowchart illustrating a processing flow executed by the snap shot management unit.

FIG. 13 is a flowchart illustrating a processing flow of creating a volume from the snap shot 125, which is executed by the snap shot management unit 130. When the snap shot management unit 130 receives, from the volume replication control unit 162, an instruction to create the volume N 120N from the snap shot 125 (step 1135 in FIG. 11), the snap shot management unit 130 starts the processing from step 1300, executes the processing from step 1300 to step 1320 in order as described below, then proceeds the processing to step 1395, and temporarily ends the present processing flow.

Step 1305: The snap shot management unit 130 receives a "number of a snap shot" which is a restoration source.

Step 1310: The snap shot management unit 130 creates the volume N 120N which is a restoration destination.

Step 1315: The snap shot management unit 130 notifies a caller that the volume N 120N is created.

Step 1320: The snap shot management unit 130 copies data of the snap shot 125 to the volume N 120N.

Figure 14:
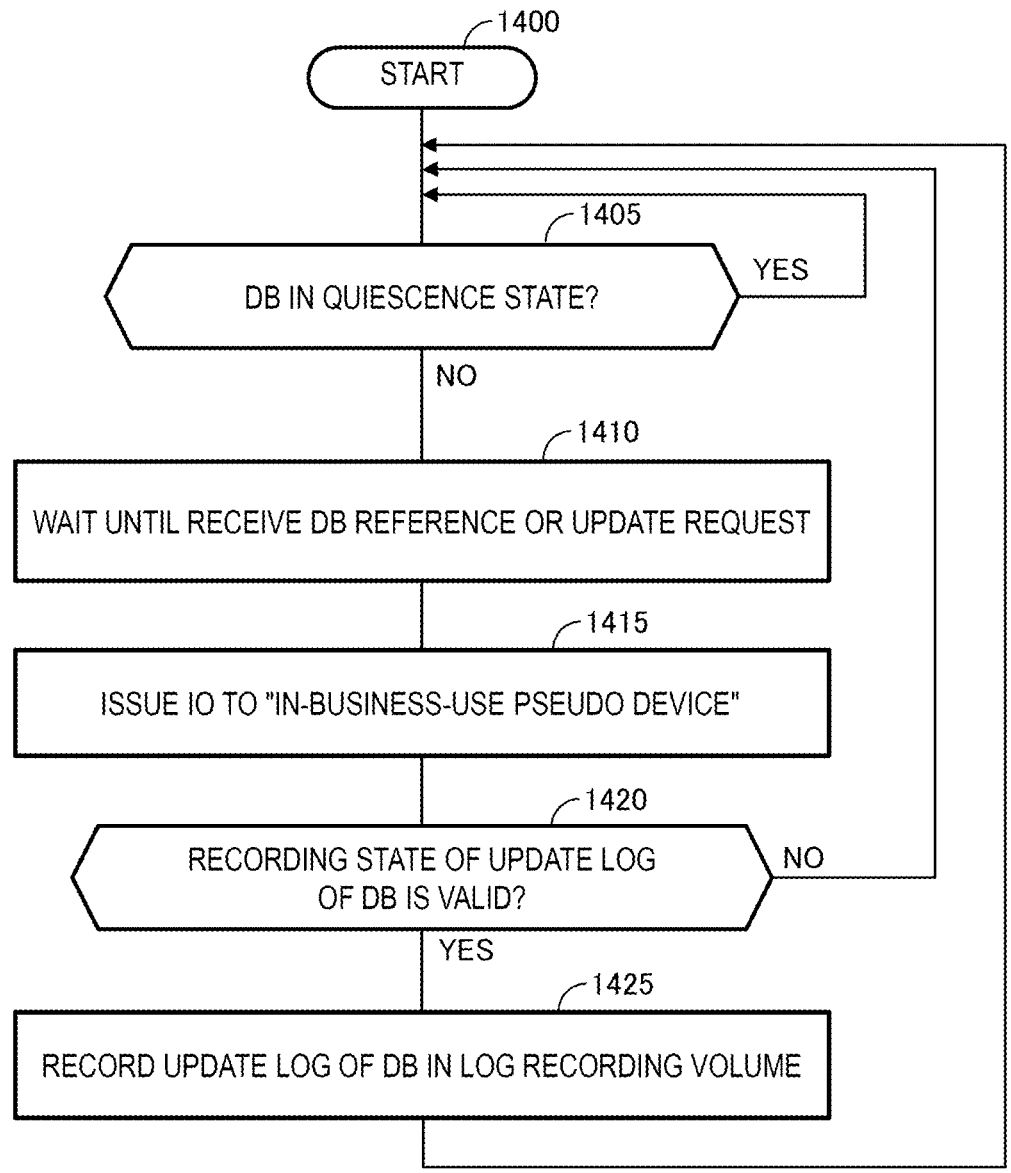
FIG. 14 is a flowchart illustrating a processing flow executed by a DBMS.

FIG. 14 is a flowchart illustrating a processing flow of IO issuing processing executed by the DBMS 140. The DBMS 140 starts the processing from step 1400, proceeds the processing to step 1405, and determines whether a DB is in a quiescence state.

When the DB is in the quiescence state, the DBMS 140 determines "YES" in step 1405, proceeds the processing to step 1405 again, and executes the processing in step 1405.

When the DB is not in the quiescence state, the DBMS 140 determines "NO" in step 1405, executes the processing in step 1410 and step 1415 in order as described below, and then proceeds the processing to step 1420.

Step 1410: The DBMS 140 waits until the DBMS 140 receives a DB reference request or an update request.

Step 1415: The DBMS 140 issues an IO to the "in-business-use pseudo device 161".

When the DBMS 140 proceeds the processing to step 1420, the DBMS 140 determines whether a recording state of an update log of a DB is valid.

When the recording state of the update log of the DB is not valid, the DBMS 140 determines "NO" in step 1420 and returns the processing to step 1405. When the recording state of the update log of the DB is valid, the DBMS 140 determines "NO" in step 1420, proceeds the processing to step 1425, and records the update log of the DB in the log recording volume O 120O. Thereafter, the DBMS 140 returns the processing to step 1405.

Figure 15:
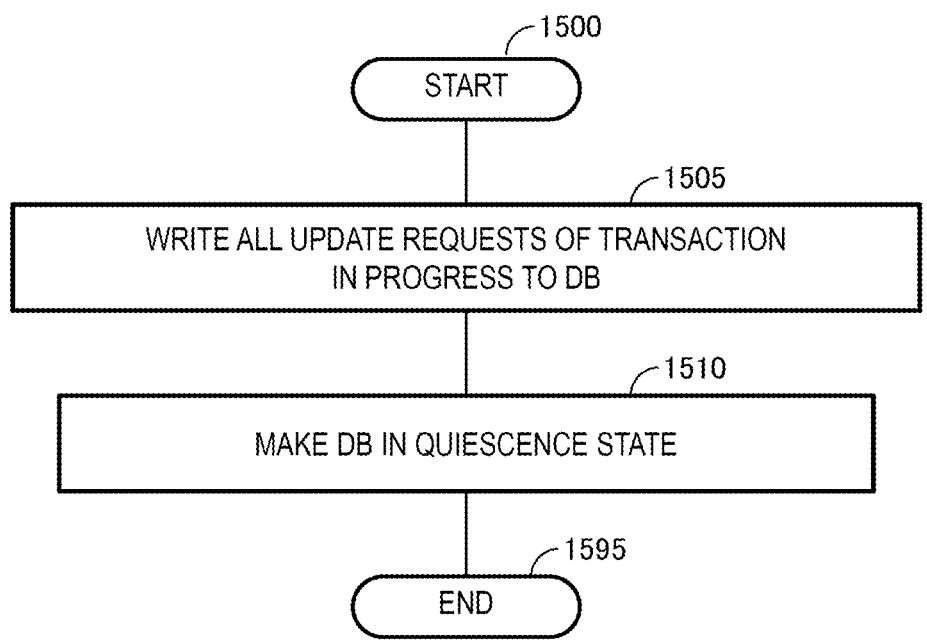
FIG. 15 is a flowchart illustrating a processing flow executed by the DBMS.

FIG. 15 is a flowchart illustrating a processing flow of DB quiescence processing executed by the DBMS 140. When the DBMS 140 receives an instruction to make a DB quiescence from the script 150 (step 905 in FIG. 9), the DBMS 140 starts the processing from step 1500, executes the processing in step 1505 and step 1510 in order as described below, then proceeds the processing to step 1595, and temporarily ends the present processing flow.

Step 1505: The DBMS 140 writes all update requests of a transaction in progress to the DB.

Step 1510: The DBMS 140 makes the DB in a quiescence state.

Figure 16:
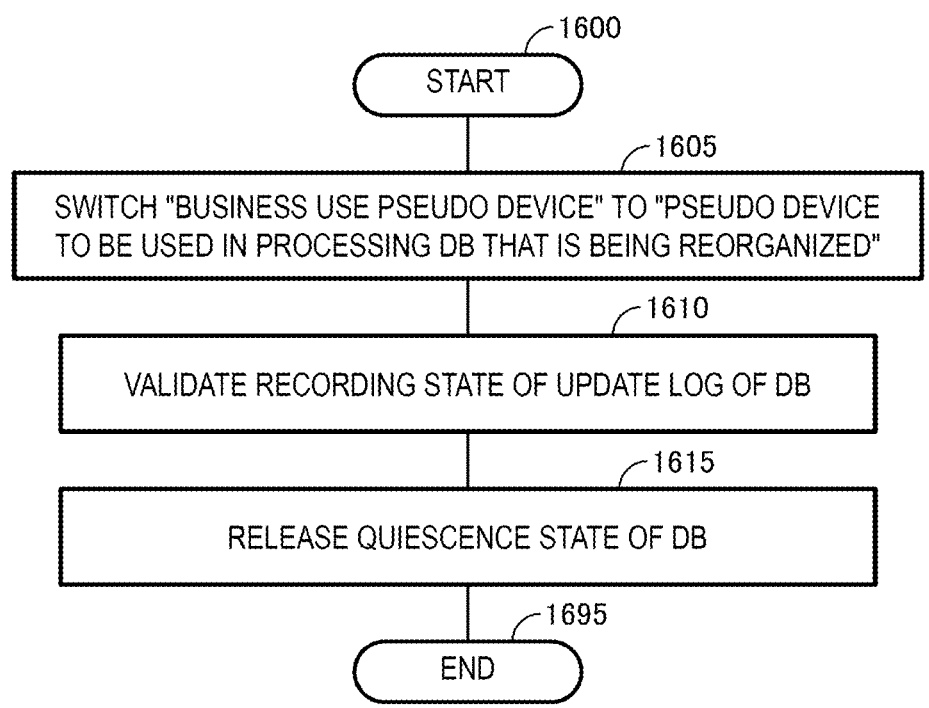
FIG. 16 is a flowchart illustrating a processing flow executed by the DBMS.

FIG. 16 is a flowchart illustrating a processing flow of switching a pseudo device to be used in business and releasing quiescence of a DB. When the DBMS 140 receives, from the script 150, an instruction to "switch a pseudo device to be used in business and release the quiescence" (step 925 in FIG. 9), the DBMS 140 starts the processing from step 1600, executes the processing from step 1605 to step 1615 in order as described below, then proceeds the processing to step 1695, and temporarily ends the present processing flow.

Step 1605: The DBMS 140 switches the pseudo device 161 to be used in business from the "in-business-use pseudo device (the first pseudo device 161a)" to a "pseudo device to be used in processing a DB that is being reorganized (the second pseudo device 161b)".

Step 1610: The DBMS 140 validates the recording state of the update log of the DB.

Step 1615: The DBMS 140 releases the quiescence state of the DB.

Figure 17:
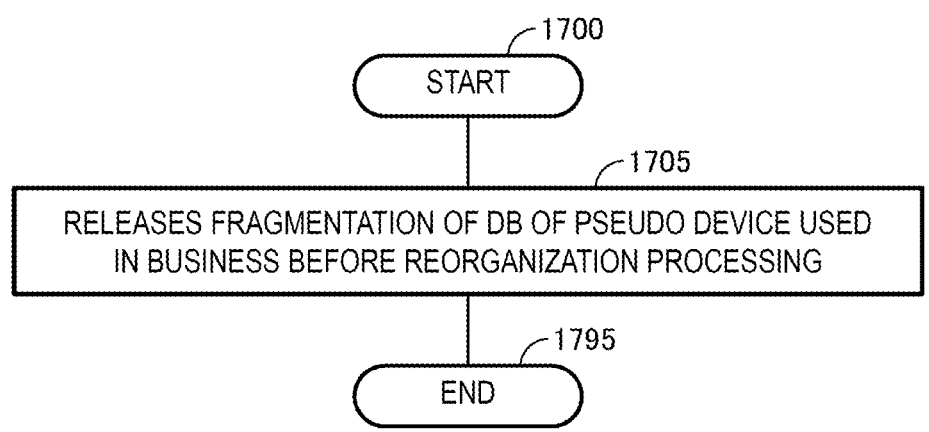
FIG. 17 is a flowchart illustrating a processing flow executed by the DBMS.

FIG. 17 is a flowchart illustrating a processing flow of DB reorganization processing executed by the DBMS 140. When the DBMS 140 receives an instruction to reorganize a DB from the script 150 (step 940 in FIG. 9), the DBMS 140 starts the processing from step 1700, executes the processing in step 1705 as described below, then proceeds the processing to step 1795, and temporarily ends the present processing flow.

Step 1705: The DBMS 140 releases fragmentation of the DB (the DB stored in the volume N 120N) of a pseudo device (the first pseudo device 161a) used in business before the reorganization processing.

Figure 18:
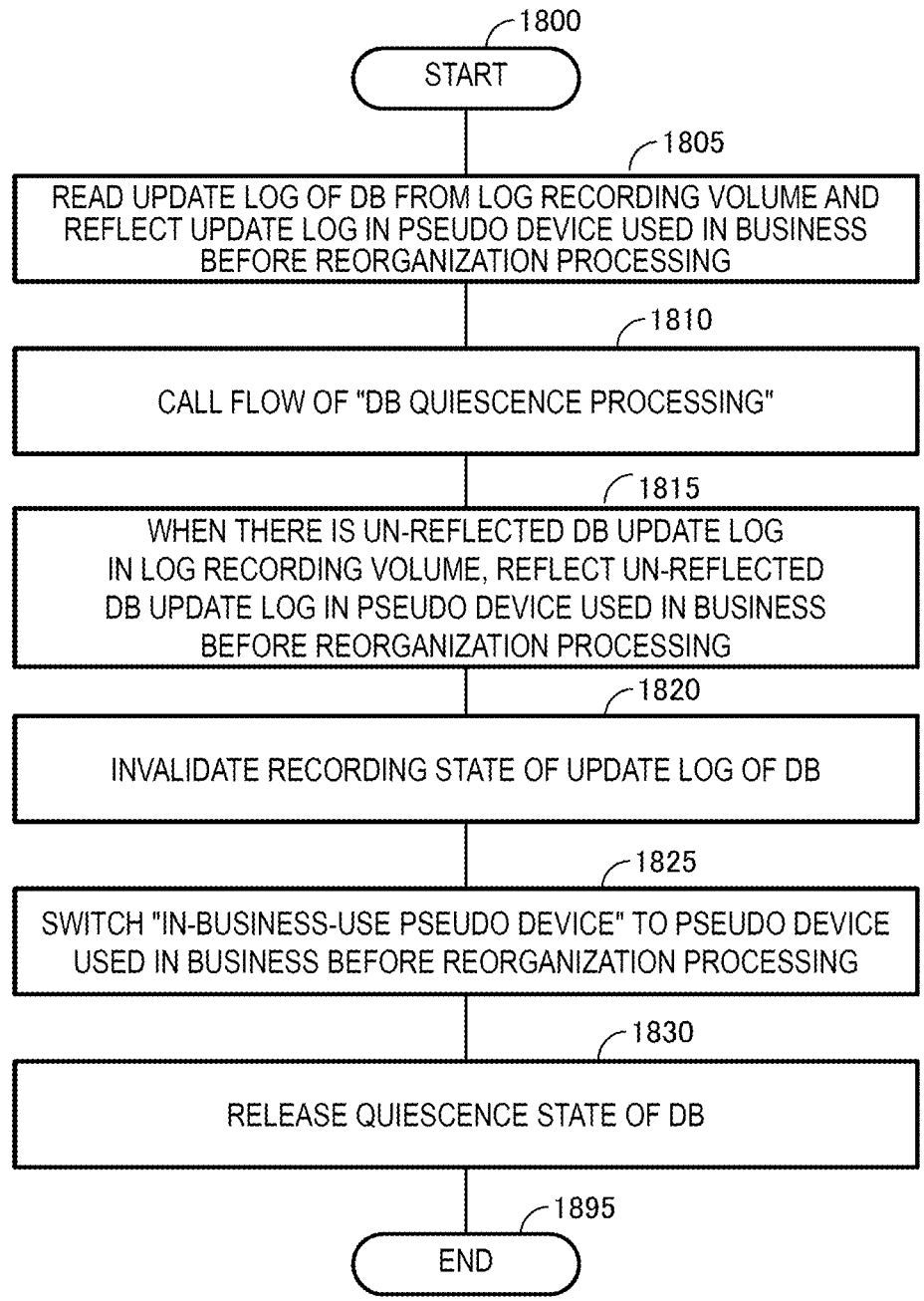
FIG. 18 is a flowchart illustrating a processing flow executed by the DBMS.

FIG. 18 is a flowchart illustrating a processing flow of reflecting an update log of the DBMS 140 and switching a pseudo device used in business. When the DBMS 140 receives an instruction to "reflect an update log" and "switch a pseudo device used in business by the DBMS 140" from the script 150 (step 950 of FIG. 9), the DBMS 140 starts the processing from step 1800, executes the processing from step 1805 to step 1830 in order as described below, then proceeds the processing to step 1895, and temporarily ends the present processing flow.

Step 1805: The DBMS 140 reads the update log of the DB from the log recording volume O 120O and reflects the update log in the first pseudo device 161a used in business before the reorganization processing.

Step 1810: The DBMS 140 makes the DB quiescence by calling a flow of the "DB quiescence processing".

Step 1815: when there is an un-reflected DB update log in the log recording volume O 120O, the DBMS 140 reflects the un-reflected DB update log in the first pseudo device 161a used in business before the reorganization processing. By the processing in step 1805 and step 1815, the IO requested from the DBMS 140 to the second pseudo device 161b during the replication of the volume N 120N from the volume M 120M and during the reorganization of the DB is processed for the replicated volume N 120N by the first pseudo device 161a. After the reorganization, data in the replication source volume M 120M and data in the replicated volume N 120N are matched.

Step 1820: The DBMS 140 invalidates the recording state of the update log of the DB.

Step 1825: The DBMS 140 switches the "in-business-use pseudo device (the second pseudo device 161b)" at a current time to the pseudo device 161 (the first pseudo device 161a) used in business before the reorganization processing.

Step 1830: The DBMS 140 releases the quiescence state of the DB.

Effects

As described above, the DB system 100 according to the embodiment of the invention can reorganize a DB without stopping business and without affecting business.

Modifications

The invention is not limited to the above-described embodiment, and various modifications can be adopted within the scope of the invention.

Figure 19:
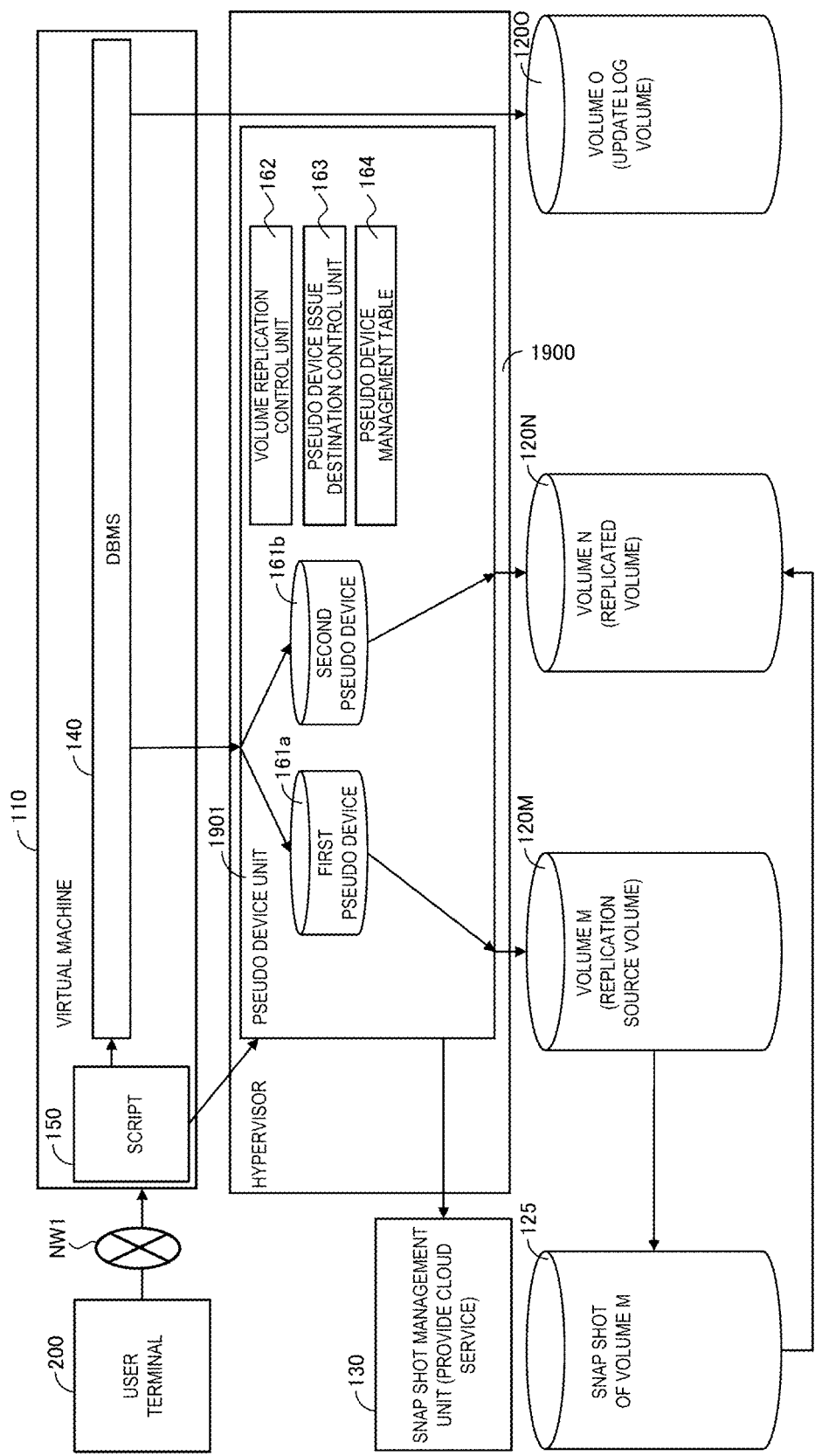
FIG. 19 is a diagram illustrating a modification of the cloud data base system according to the embodiment of the invention.

In the above-described embodiment, the driver 160 may be omitted in the DB system 100, and instead, the DBMS 140 may have the function of the driver 160. In the above-described embodiment, the driver 160 may be omitted in the DB system 100, and instead, an OS operating on the virtual machine 110 may have the function of the driver 160. In the above-described embodiment, as illustrated in FIG. 19, the driver 160 in the virtual machine 110 may be omitted, and the DB system 100 may include a hypervisor 1900 for providing a virtual computing environment, a pseudo device unit 1901 having the same function as that of the driver 160 in the hypervisor 1900, and the virtual machine 110 including the script 150 and the DBMS 140. In the above-described embodiment, the virtual machine 110 including the script 150 and the DBMS 140, and the driver 160 or a device having the same function as the driver 160 may be implemented as a container.

REFERENCE SIGNS LIST

100: cloud data base system
110: virtual machine
120M: volume M
120N: volume N
120O: volume O
125: snap shot
130: snap shot management unit
140: DBMS
150: script
161a: first pseudo device
161b: second pseudo device
162: volume replication control unit
163: pseudo device issue destination control unit
164: pseudo device management table
200: user terminal

The invention claimed is:

1. A cloud data base system provided by a cloud service, the cloud data base system comprising:
  a network;
  a volume that is a block storage configured to store a data base;
  a virtual computing environment, wherein the virtual computing environment includes:
    a data base management system configured to request input/output (IO),
    a first pseudo device configured to receive the IO, issue the IO to the volume, and switch the volume that is an issue destination of the IO, and
    a second pseudo device configured to receive the IO, issue the IO to the volume, and switch the volume that is an issue destination of the IO, wherein the second pseudo device is different from the first pseudo device, and
    the data base management system requests the IO to any one of the first pseudo device and the second pseudo device, and causes any one of the first pseudo device and the second pseudo device to issue the IO to the volume; and
  a computer configured to perform operations comprising:
    in response to an instruction received from a device, creating in an object storage provided by an object storage service of the cloud service, by a replication function of the cloud service, a data copy of a replication source volume that stores the data base;
    when the IO is requested to the first pseudo device, and the data base that is in a quiescence state is reorganized in a normal business state without stopping processing of a data base system in on-premise, switching, based on a value indicating a switching mode that is received from a script executed on the database management system, a request destination of the IO from the first pseudo device to the second pseudo device, wherein the switching the request destination causes the replication function to create a replicated volume from the data copy and causes the first pseudo device to reorganize the data base stored in the replicated volume while causing the second pseudo device to continue issuing the IO to the replication source volume;

after the creation of the replicated volume is completed, reading, by the first pseudo device, an entire area of the replicated volume to transfer un-transferred data from the data copy to the replicated volume, and recording, by the data base management system, a log of an update IO request to the data base in the volume for an update log; and after the reorganization of the data base is completed, deleting the replication source volume and switching the request destination of the IO from the second pseudo device to the first pseudo device.

2. The cloud data base system according to claim 1, wherein after the reorganization of the data base by the first pseudo device is completed, the data base management system causes the first pseudo device to issue the IO to the replicated volume that stores the data base after the reorganization.

3. The cloud data base system according to claim 2, further comprising: the volume for an update log, wherein the data base management system records a log of an update IO request to the data base in the volume for an update log while causing the second pseudo device to continue issuing the IO to the replication source volume that is the volume storing the data base.

4. The cloud data base system according to claim 3, wherein after the reorganization of the data base is completed, the data base management system reflects the update log of the update IO request in the replicated volume that stores the data base after the reorganization before causing the first pseudo device to issue the IO to the replicated volume that stores the data base after the reorganization.

5. The cloud data base system according to claim 1, wherein the virtual computing environment includes the first pseudo device and the second pseudo device, and includes a driver configured to control the volume that is the issue destination of the IO of the first pseudo device and the second pseudo device.

6. A data management method to be applied to a cloud data base system, the data management method comprising:

providing, by a cloud service executed on a computer system, the cloud data base system, wherein the cloud database system includes a virtual computing environment and a volume that is a block storage configured to store a data base, wherein the virtual computing environment includes:

a data base management system configured to request an input/output (IO), a first pseudo device configured to receive the IO, issue the IO to the volume, and switch the volume that is an issue destination of the IO, and a second pseudo device configured to receive the IO, issue the IO to the volume, and switch the volume that is an issue destination of the IO, wherein the second pseudo device is different from the first pseudo device;

requesting, by the data base management system, the IO to any one of the first pseudo device and the second pseudo device, and causing any one of the first pseudo device and the second pseudo device to issue the IO to the volume;

in response to an instruction received from a device, creating in an object storage provided by an object storage service of the cloud service, by a replication function of the cloud service, a data copy of a replication source volume that stores the data base;

when the IO is requested to the first pseudo device, and the data base that is in a quiescence state is reorganized in a normal business state without stopping processing of a data base system in on-premise, switching, based on a value indicating a switching mode that is received from a script executed on the database management system, a request destination of the IO from the first pseudo device to the second pseudo device, wherein the switching the request destination causes the replication function to create a replicated volume from the data copy and causes the first pseudo device to reorganize the data base stored in the replicated volume while causing the second pseudo device to continue issuing the IO to the replication source volume;

after the creation of the replicated volume is completed, reading, by the first pseudo device, an entire area of the replicated volume to transfer un-transferred data from the data copy to the replicated volume, and recording, by the data base management system, a log of an update IO request to the data base in the volume for an update log; and after the reorganization of the data base is completed, deleting, by the data base management system, the replication source volume and switching the request destination of the IO from the second pseudo device to the first pseudo device.

* * * * *